US005912964A

United States Patent [19]

Stelman

[11] Patent Number: 5,912,964

[45] Date of Patent: Jun. 15, 1999

[54] ADAPTIVE TELEPHONE HANDSET INTERFACE

[75] Inventor: Bruce W. Stelman, San Jose, Calif.

[73] Assignee: Hello Direct, Inc., San Jose, Calif.

[21] Appl. No.: 09/037,259

[22] Filed: Mar. 9, 1998

Related U.S. Application Data

[63] Continuation-in-part of application No. 08/625,398, Mar. 27, 1996

[60] Provisional application No. 60/064,382, Nov. 6, 1997.

[51] Int. Cl.$^{6}$ .................................................... H04M 11/00

[52] U.S. Cl. ........................ 379/387; 379/93.09; 379/345; 379/394; 379/402

[58] Field of Search .................................... 379/387, 1, 3, 379/6, 395, 210, 218, 223, 399, 405, 400, 402, 413, 414, 442, 93.09, 394, 345

[56] References Cited

U.S. PATENT DOCUMENTS

| | | | |
|---|---|---|---|
| D. 312,627 | 12/1990 | Gutzmer | D14/107 |
| 3,566,271 | 2/1971 | Whang et al. | 325/65 |
| 3,715,513 | 2/1973 | Miller | 179/18 AD |
| 3,865,995 | 2/1975 | Kerman et al. | 179/99 |
| 3,943,305 | 3/1976 | Hagedorn | 179/175.3 R |
| 4,088,844 | 5/1978 | Kinnaird, Jr. | 179/99 |
| 4,142,075 | 2/1979 | Olschewski | 179/170 |

(List continued on next page.)

FOREIGN PATENT DOCUMENTS

| | | | |
|---|---|---|---|
| 0 298 719 | 1/1989 | European Pat. Off. | H04M 9/08 |
| 0 331 838 | 9/1989 | European Pat. Off. | H04M 9/00 |
| 3410145 | 10/1985 | Germany | H04M 3/42 |
| 93/03561 | 2/1993 | WIPO | H04L 1/20 |
| 97/36411 | 10/1997 | WIPO | H04M 1/100 |

OTHER PUBLICATIONS

K.D. Witt, "Switch Box For Voice/Data Communication" IBM Technical Disclosure Bulletin, vol. 14 No. 5, Oct. 1971.

Precision Components, Inc.'s advertisement for Data Switch in Teleconnect Magazine, May 1988.

TVMP, Inc.'s advertisement for Phoneflex in PC Week Magazine, Jun. 1988.

A–Jem's data sheet, Jan. 1988.

Walker Equipment Corp. advetisement for W10 Receiver Amplifier, Sep. 8, 1986, p.65.

Signetics Linear Products, TEA 1060/61 Product Specification, pp. 6–102 to 6–112, Aug. 1, 1988.

*Primary Examiner*—Daniel S. Hunter
*Assistant Examiner*—Jacques Saint-Surin
*Attorney, Agent, or Firm*—Haverstock & Owens LLP

[57] ABSTRACT

An adaptive handset interface for interfacing a two-wire analog telephone instrument to a telephone set having a base unit connected to a handset via a four-wire handset cable. The interface is suitable for use with a variety of telephone sets produced by different manufacturers despite differences in the signalling between the telephone base and the handset. This is because, upon initiation of a learning technique, the interface automatically adapts to variations in signalling between the telephone base and handset among the different telephone manufacturers. To use the interface, the handset is unplugged from the handset jack of the telephone base and plugged into a handset jack of the interface. In addition, a four-wire cable is plugged into a telephone base jack of the interface and into the handset jack of telephone base. The interface includes a modular jack for coupling the interface device to the two-wire telephone instrument. The interface device incorporates three different techniques for learning the signalling characteristics of the telephone set: a self-contained technique which is executed under control of a control circuit contained within the interface; a technique which requires the user to dial a telephone number to couple the interface to an automated host system which then controls the learning process; and a technique which requires the user to dial a telephone number and, then, a technician controls the learning process. The latter two of the three techniques are used only if the self-contained technique is not completely successful.

26 Claims, 13 Drawing Sheets

U.S. PATENT DOCUMENTS

| | | | |
|---|---|---|---|
| 4,153,916 | 5/1979 | Miwa et al. | 358/257 |
| 4,160,122 | 7/1979 | Jacobson | 179/1 A |
| 4,161,633 | 7/1979 | Treiber | 179/170.2 |
| 4,284,859 | 8/1981 | Araseki | 179/170 NC |
| 4,319,092 | 3/1982 | van den Enden et al. | 179/18 FA |
| 4,367,374 | 1/1983 | Serrano | 179/2 C |
| 4,387,271 | 6/1983 | Artom | 179/2 DP |
| 4,425,664 | 1/1984 | Sherman et al. | 375/8 |
| 4,446,335 | 5/1984 | Lee et al. | 179/2 C |
| 4,506,112 | 3/1985 | Bitsch | 179/81 R |
| 4,588,856 | 5/1986 | Cohen | 179/2 C |
| 4,606,044 | 8/1986 | Kudo | 375/13 |
| 4,617,656 | 10/1986 | Kobayashi et al. | 370/74 |
| 4,636,584 | 1/1987 | Binkerd et al. | 379/240 |
| 4,677,667 | 6/1987 | Burns | 379/398 |
| 4,759,054 | 7/1988 | Mellon | 379/145 |
| 4,759,059 | 7/1988 | Christensen | 379/161 |
| 4,782,524 | 11/1988 | McQuinn et al. | 379/395 |
| 4,788,720 | 11/1988 | Brennan et al. | 379/201 |
| 4,815,121 | 3/1989 | Yoshida | 379/67 |
| 4,825,465 | 4/1989 | Ryan | 379/399 |
| 4,852,153 | 7/1989 | Streck | 379/100 |
| 4,852,160 | 7/1989 | Kiko et al. | 379/405 |
| 4,856,049 | 8/1989 | Streck | 379/67 |
| 4,864,567 | 9/1989 | Giorgio | 370/118 |
| 4,879,738 | 11/1989 | Petro | 379/3 |
| 4,894,860 | 1/1990 | Korsky et al. | 379/240 |
| 4,907,267 | 3/1990 | Gutzmer | 379/442 |
| 4,914,690 | 4/1990 | Hagedorn | 379/233 |
| 4,928,306 | 5/1990 | Biswas et al. | 379/201 |
| 4,932,047 | 6/1990 | Emmons et al. | 379/53 |
| 4,939,767 | 7/1990 | Saito et al. | 379/53 |
| 4,951,312 | 8/1990 | Tanikawa et al. | 379/394 |
| 4,984,262 | 1/1991 | Kumozaki et al. | 379/5 |
| 4,989,243 | 1/1991 | Choi | 379/402 |
| 4,991,196 | 2/1991 | Krebs | 379/27 |
| 4,996,706 | 2/1991 | Cho | 379/93 |
| 5,001,746 | 3/1991 | Nishijima | 379/99 |
| 5,003,580 | 3/1991 | Duong et al. | 379/93 |
| 5,014,299 | 5/1991 | Klupt et al. | 379/98 |
| 5,018,184 | 5/1991 | Abrams et al. | 379/29 |
| 5,034,978 | 7/1991 | Nguyen et al. | 379/402 |
| 5,059,141 | 10/1991 | Scott | 439/638 |
| 5,073,919 | 12/1991 | Hagensick | 379/29 |
| 5,097,501 | 3/1992 | Kutzavitch | 379/165 |
| 5,133,006 | 7/1992 | Khuat | 379/399 |
| 5,151,936 | 9/1992 | Riedle | 379/403 |
| 5,164,982 | 11/1992 | Davis | 379/96 |
| 5,172,411 | 12/1992 | Gazsi | 379/402 |
| 5,175,763 | 12/1992 | Gazsi | 379/402 |
| 5,179,586 | 1/1993 | Lee | 379/93 |
| 5,185,789 | 2/1993 | Hanon et al. | 379/395 |
| 5,206,898 | 4/1993 | Nishijima | 379/90 |
| 5,237,605 | 8/1993 | Peak et al. | 379/399 |
| 5,249,218 | 9/1993 | Sainton | 379/59 |
| 5,289,538 | 2/1994 | Lauer et al. | 379/402 |
| 5,321,745 | 6/1994 | Drory et al. | 379/351 |
| 5,323,449 | 6/1994 | Mori et al. | 379/100 |
| 5,323,451 | 6/1994 | Yatsunami | 379/100 |
| 5,333,194 | 7/1994 | Caesar | 379/402 |
| 5,365,577 | 11/1994 | Davis et al. | 379/96 |
| 5,444,770 | 8/1995 | Davis et al. | 379/99 |
| 5,448,646 | 9/1995 | Lucey et al. | 381/74 |
| 5,454,036 | 9/1995 | Gleeman et al. | 379/392 |
| 5,455,859 | 10/1995 | Gutzmer | 379/442 |
| 5,471,523 | 11/1995 | Smith et al. | 379/165 |
| 5,473,676 | 12/1995 | Frick et al. | 379/99 |
| 5,493,609 | 2/1996 | Winseck, Jr. et al. | 379/96 |
| 5,528,685 | 6/1996 | Cwynar et al. | 379/405 |
| 5,533,092 | 7/1996 | Kaziwara | 379/21 |
| 5,550,901 | 8/1996 | Williams | 379/93 |
| 5,550,913 | 8/1996 | McMaster et al. | 379/230 |
| 5,555,300 | 9/1996 | Gutzmer | 379/395 |
| 5,557,669 | 9/1996 | Perry et al. | 379/339 |
| 5,557,670 | 9/1996 | Perry et al. | 379/339 |
| 5,557,672 | 9/1996 | Perry et al. | 379/399 |
| 5,577,115 | 11/1996 | Deutsch et al. | 379/399 |
| 5,583,922 | 12/1996 | Davis et al. | 379/96 |
| 5,586,181 | 12/1996 | Kiko | 379/399 |
| 5,621,731 | 4/1997 | Dale et al. | 370/79 |
| 5,625,679 | 4/1997 | Gutzmer | 379/99 |
| 5,631,955 | 5/1997 | Adams et al. | 379/387 |

Smart Interface Technology (SIT) Project
Preliminary Line Configuration Switching Algorithms and Model Equivalent Line Configuration Switching Model

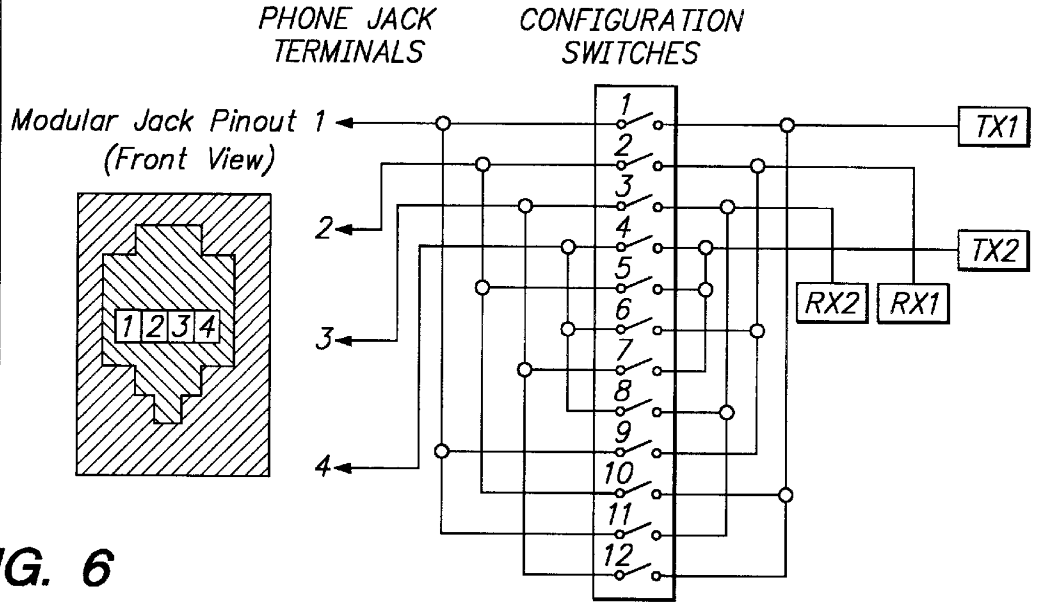

FIG. 6

| Dialtone Detection | Rx Pinout | Tx Pinout Sequence | Algorithm Ref. No. | Model Sw. "ON" |
|---|---|---|---|---|
| Pins 2 & 3 | Pins 2 & 3 | Pins 1 & 4 (Primary) | 1 | 1,2,3,4 |
| Pins 2 & 3 | Pins 2 & 3 | Pins 1 & 2 (2nd Try) | 2 | 1,2,3,5 |
| Pins 2 & 3 | Pins 2 & 3 | Pins 1 & 3 (3rd Try) | 3 | 1,2,3,7 |
| Pins 2 & 3 | Pins 2 & 3 | Pins 4 & 2 (4th Try) | 4 | 2,3,4,10 |
| Pins 2 & 3 | Pins 2 & 3 | Pins 4 & 3 (5th Try) | 5 | 2,3,4,12 |
| Pins 2 & 4 | Pins 2 & 4 | Pins 1 & 3 (Primary) | 6 | 1,2,7,8 |
| Pins 2 & 4 | Pins 2 & 4 | Pins 1 & 2 (2nd Try) | 7 | 1,2,5,8 |
| Pins 2 & 4 | Pins 2 & 4 | Pins 1 & 4 (3rd Try) | 8 | 1,2,4,8 |
| Pins 2 & 4 | Pins 2 & 4 | Pins 3 & 2 (4th Try) | 9 | 2,5,8,12 |
| Pins 2 & 4 | Pins 2 & 4 | Pins 3 & 4 (5th Try) | 10 | 2,4,8,12 |
| Pins 1 & 2 | Pins 1 & 2 | Pins 3 & 4 (Primary) | 11 | 2,4,11,12 |
| Pins 1 & 2 | Pins 1 & 2 | Pins 3 & 1 (2nd Try) | 12 | 1,2,11,12 |
| Pins 1 & 2 | Pins 1 & 2 | Pins 3 & 2 (3rd Try) | 13 | 2,5,11,12 |
| Pins 1 & 2 | Pins 1 & 2 | Pins 4 & 1 (4th Try) | 14 | 1,2,4,11 |
| Pins 1 & 2 | Pins 1 & 2 | Pins 4 & 2 (5th Try) | 15 | 2,4,10,11 |
| Pins 1 & 3 | Pins 1 & 3 | Pins 2 & 4 (Primary) | 16 | 3,4,9,11 |
| Pins 1 & 3 | Pins 1 & 3 | Pins 2 & 1 (2nd Try) | 17 | 1,3,5,9 |
| Pins 1 & 3 | Pins 1 & 3 | Pins 2 & 3 (3rd Try) | 18 | 3,5,9,12 |
| Pins 1 & 3 | Pins 1 & 3 | Pins 4 & 1 (4th Try) | 19 | 1,3,4,9 |
| Pins 1 & 3 | Pins 1 & 3 | Pins 4 & 3 (5th Try) | 20 | 3,4,9,12 |

| Dialtone Detection | Rx Pinout | Tx Pinout Sequence | Algorithm Ref. No. | Model Sw. "ON" |
|---|---|---|---|---|
| Pins 1 & 4 | Pins 1 & 4 | Pins 2 & 3 (Primary) | 21 | 7,8,9,10 |
| Pins 1 & 4 | Pins 1 & 4 | Pins 2 & 1 (2nd Try) | 22 | 1,5,8,9 |
| Pins 1 & 4 | Pins 1 & 4 | Pins 2 & 4 (3rd Try) | 23 | 4,8,9,10 |
| Pins 1 & 4 | Pins 1 & 4 | Pins 3 & 1 (4th Try) | 24 | 1,7,8,9 |
| Pins 1 & 4 | Pins 1 & 4 | Pins 3 & 4 (5th Try) | 25 | 4,8,9,12 |
| Pins 3 & 4 | Pins 3 & 4 | Pins 1 & 2 (Primary) | 26 | 1,3,5,6 |
| Pins 3 & 4 | Pins 3 & 4 | Pins 1 & 3 (2nd Try) | 27 | 1,3,6,7 |
| Pins 3 & 4 | Pins 3 & 4 | Pins 1 & 4 (3rd Try) | 28 | 1,3,4,6 |
| Pins 3 & 4 | Pins 3 & 4 | Pins 2 & 3 (4th Try) | 29 | 3,6,7,10 |
| Pins 3 & 4 | Pins 3 & 4 | Pins 2 & 4 (5th Try) | 30 | 3,4,6,10 |

| ALGORITHM REF. NUMBER | SWITCHING MODEL ACTION | ALGORITHM REF. NUMBER | SWITCHING MODEL ACTION |
|---|---|---|---|
| 31 | Switch 1: "ON" | 43 | Switch 7: "ON" |
| 32 | Switch 1: "OFF" | 44 | Switch 7: "OFF" |
| 33 | Switch 2: "ON" | 45 | Switch 8: "ON" |
| 34 | Switch 2: "OFF" | 46 | Switch 8: "OFF" |
| 35 | Switch 3: "ON" | 47 | Switch 9: "ON" |
| 36 | Switch 3: "OFF" | 48 | Switch 9: "OFF" |
| 37 | Switch 4: "ON" | 49 | Switch 10: "ON" |
| 38 | Switch 4: "OFF" | 50 | Switch 10: "OFF" |
| 39 | Switch 5: "ON" | 51 | Switch 11: "ON" |
| 40 | Switch 5: "OFF" | 52 | Switch 11: "OFF" |
| 41 | Switch 6: "ON" | 53 | Switch 12: "ON" |
| 42 | Switch 6: "OFF" | 54 | Switch 12: "OFF" |

Notes:

1) Algorith No. 1 wil be the default setting for system power-up, hard or soft resets and "learning" timeout conditions.
2) Ideally all 12 equivalent switches can be selected and switched "on" or "off" independent of the above algorithm's.

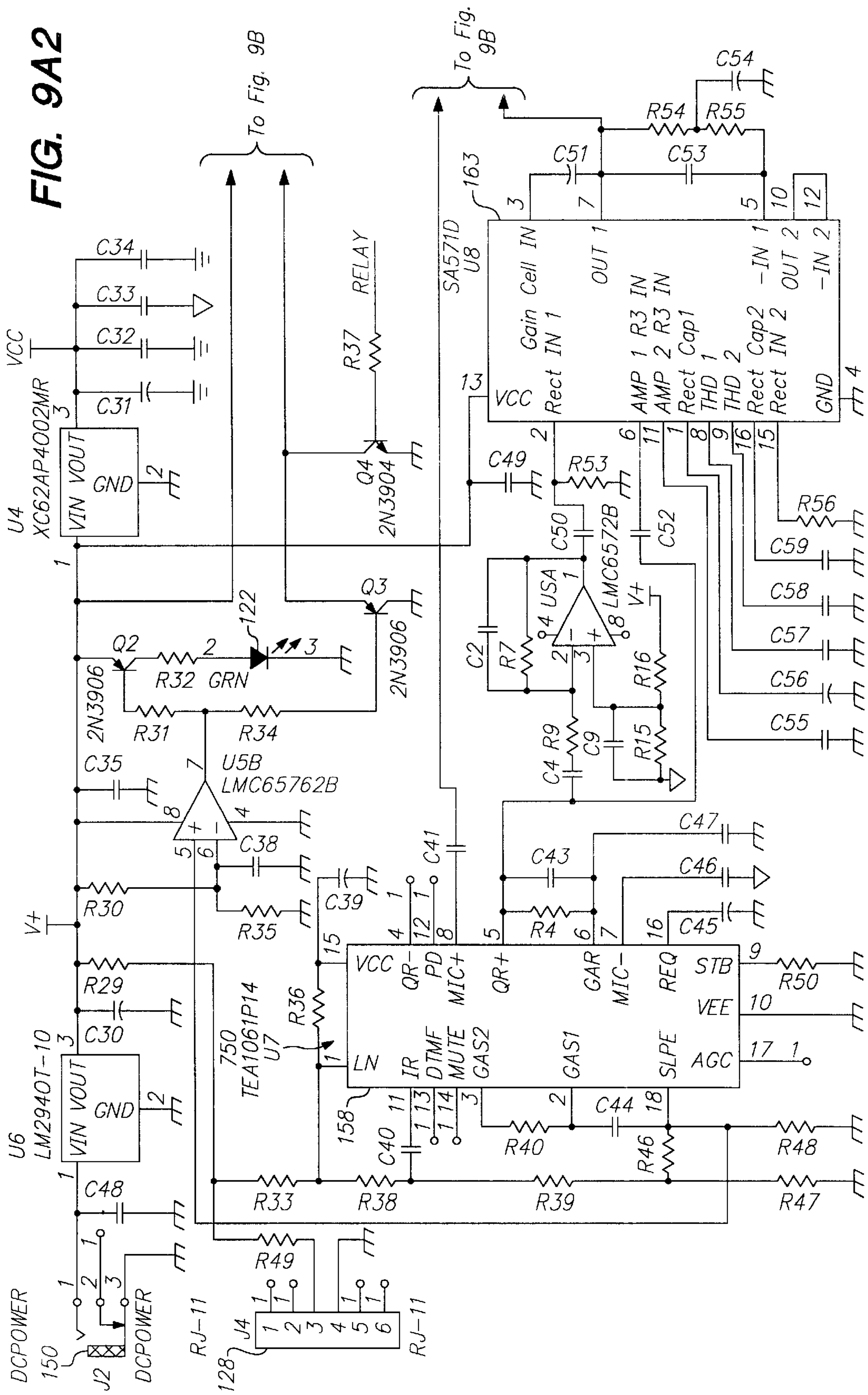
FIG. 9A2

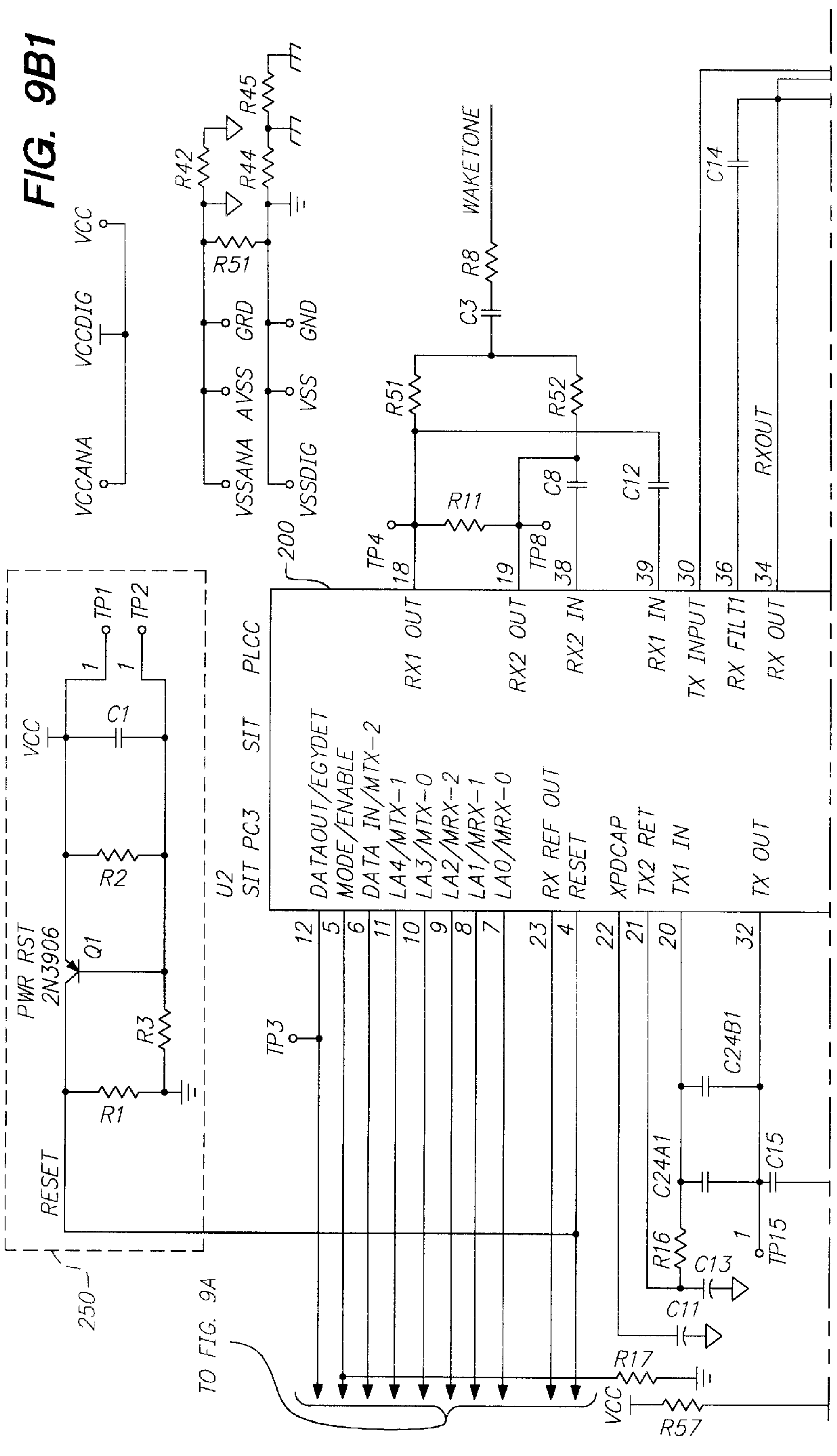
FIG. 9B1

FIG. 9B2

4x4x1 CROSSPOINT SWITCH

ADAPTIVE TELEPHONE HANDSET INTERFACE

This is a continuation-in-part of application Ser. No. 08/625,398, filed Mar. 27, 1996, the contents of which are hereby incorporated by reference. This application claims the benefit of U.S. Provisional Application Ser. No. 60/064, 382, filed Nov. 6, 1997.

FIELD OF THE INVENTION

This invention relates to the field of telephony. More particularly, this invention relates to an adaptive interface for interfacing a two-wire analog telephone instrument, such as a modem, fax modem, facsimile machine or teleconferencing device, to telephone set through a four-wire handset port of the telephone set.

BACKGROUND OF THE INVENTION

A two-wire telephone set includes a base unit connected to a central office of a telephone service provider via a two-wire telephone line and also includes a handset connected to the telephone base via a four-wire handset cable. The handset cable has four wires because, for two-way voice communication, the handset includes both a microphone and a speaker, each of which requires a pair of wires. Typically, the telephone base supplies audio signals to the speaker and a DC biasing voltage to the microphone, while the telephone base receives audio signals from the microphone. A two-wire to four-wire converter included in the telephone set converts the two central office signals into the four handset signals. In addition, the telephone set includes a ring detector for detecting an AC ring signal provided by the central office and a hook-switch for signalling the central office of the on-hook/off-hook status of the telephone set. The hook switch controls draw of DC current from the central office by the telephone set, which is sensed by the central office.

A conventional modem transmits digital data over a two-wire telephone line by modulating an analog carrier signal according to the digital data. Typically, the digital data is generated by a computer or facsimile machine connected to the modem. The carrier signal is a tone within the frequency range of telephone transmission line. Upon reception by a second modem at the other end of the transmission line, the digital data is reconstructed by demodulating the received signal.

Business organizations often utilize a private branch exchange (PBX) for providing telephone service to telephone users within the organization. Telephones located on the desks of the users are each connected to the PBX while the PBX is connected to a telephone service provider via one or more outside lines. The PBX typically includes capability for appropriately connecting incoming calls to the user telephone sets and for connecting outgoing calls from a user telephone set to an outside line. In this way, fewer than one outside line per user telephone is needed, thus, reducing the cost of the telephone service. In addition, the PBX typically provides a variety of features to the users of the PBX, such as connecting calls among the users and providing voicemail services.

To implement all of the functions of the PBX, certain control and overhead communications must take place between each user's telephone set and the PBX. These communications typically include digital status and command signals in addition to the two-way voice signals necessary to carry on a telephone conversation. For example, the PBX must know whether a telephone set is connected to a particular extension in order to know whether or not to route calls to that extension. As another example, the PBX must interact with the user telephone sets in order for the users to initiate and terminate telephone calls and to access voicemail and other features of the PBX.

In general, the protocol utilized for control and overhead communications differs among the various manufacturers of PBX's. In addition, the voice signals can be digitally sampled and compressed according to various different companding schemes (e.g. $\mu$-law or A-law). Therefore, a two-wire analog telephone instrument, such as modem, fax modem, facsimile machine or teleconferencing device, cannot generally interface directly with the PBX without a dedicated analog port from the PBX.

This creates a problem for users of a PBX who wish to use universally available analog telephone instruments, such as modems, fax modems, facsimile machines, teleconferencing devices, headsets or handsets, in addition to their PBX-compatible telephone sets. This problem has intensified by a recent increase in demand for access to the world wide web, which is typically accessed through use of a modem connected to a personal computer. A proposal has been to provide a dedicated outside line for each such analog telephone instrument. This solution is not entirely satisfactory, however, because it negates the savings which result from the PBX limiting the number of required outside lines. Another solution has been to provide an analog line card in the PBX and a separate line connecting the two-wire analog telephone instrument to the PBX. This solution can be costly due to the need to install separate extension lines to connect each of the PBX-compatible telephone set and the analog telephone instrument to the PBX. Further, the addition of analog line cards can necessitate a PBX that is has a higher capacity, and hence, higher cost, that would otherwise be required.

Another solution has been to provide a device which interfaces a modem with a telephone set through the handset port of the telephone set. For example, U.S. Pat. No. 4,907,267 discloses a modem interface device for use with a telephone set having a base unit and a handset. The telephone set can be a two-wire telephone set or a telephone set designed for use with a PBX. To use the modem interface device, the handset is unplugged from the handset jack of the base and plugged into a handset jack in one end of the device. Extending from the device is a four-wire cable which is connected to the handset jack of the base. The device also includes a modular jack for accepting a two-wire cable which connects the device to a two-wire telephone instrument, such as a modem. A series of switches are manually positioned to select between voice and data communications and to configure the interface device to match the signalling characteristics of the particular telephone set being used.

The manually operable switch arrangement described in U.S. Pat. No. 4,907,267 is improved upon in two products manufactured by Unlimited Systems Corp. of San Diego, Calif. A first of these products, the "KONEXX Office Konnector," connects to the base of a telephone set and to the handset to provide an interface for a two-wire telephone, facsimile machine or modem. The device detects when the two-wire telephone, facsimile machine or modem is placed off-hook for switching between voice and data communications. A second of the these products, the "KONEXX Konference," is similarly connected between the base and handset, but provides an interface for a teleconferencing device. For each of these devices, a manually operable switch is positioned in one of four positions for adjusting the device to the signalling characteristics of the particular telephone set being used.

A drawback to the aforementioned interface devices is that the switch positions may be incorrectly set. In addition, there is a likelihood of encountering a telephone set having signalling characteristics that cannot be met by these interface devices. For example, the bias voltage level and AC signal coupling characteristics of the microphone connection to the telephone base can vary from manufacturer to manufacturer as well as the output impedance and signal levels provided via the handset speaker connection. Also, the wire assignments within the handset cable can vary. A single return may be provided for both the microphone and speaker or each may have two dedicated wires. Failure of an interface device to properly match the signalling characteristics of the telephone set may result in inoperability or lost data and may result in the frustration of users of such devices who may not have the technical ability, nor the inclination, to resolve such problems.

What is needed is a telephone handset interface that has sufficient flexibility to match the signalling characteristics of a wide variety of commercially available telephone sets while minimizing technical ability required from a user of such interface.

SUMMARY OF THE INVENTION

The invention is an adaptive handset interface method and apparatus for interfacing a two-wire analog telephone instrument, such as a facsimile machine, fax modem, modem or teleconferencing device, to a telephone set having a base unit coupled to a handset via a four-wire handset cable. The interface device is suitable for use with a variety of telephone sets produced by different manufacturers despite differences in signalling characteristics between the base and the handset. This is because, upon initiation of a learning technique, the interface device automatically adapts itself to variations in signalling characteristics between the telephone base and handset among the different telephone manufacturers.

The interface device incorporates three different techniques for learning, and adapting to, the signalling characteristics of the four-wire interface found in most telephone sets: a self-contained technique which is executed under control of a controller circuit contained within the interface device; a technique which requires the user to dial a telephone number to couple the interface device to an automated host system which then controls the learning process; and a technique which requires the user to dial a telephone number and, then, a technician controls the learning process. The latter two of the three techniques are used only if the self-contained technique is not completely successful.

To use the interface device, the handset is unplugged from the handset jack of the telephone base and plugged into a handset jack of the interface device. Thus, the device is coupled to the four wires of the handset. In addition, a four-wire cable is plugged into a telephone base jack of the interface device and into the handset jack of the telephone base. Thus, the interface device is coupled to the four handset connections of the telephone base. The interface device also includes a modular jack for accepting a two-wire cable for coupling the interface device to the two-wire analog telephone instrument. The jack forms an interface port for interfacing with the two-wire analog telephone instrument and is preferably a type RJ-11 jack.

The self-contained learning technique first requires that the user lift the handset from its cradle. The user then initiates the learning technique by pressing a momentary-on button located on the interface device. Because the handset is uncradled, a dial tone appears as an AC voltage across the two speaker wires from the handset jack of the telephone base. All four wires from the handset jack of the telephone base are coupled to a resistive shunt array and, then, routed through a cross-point switch matrix. The controller circuit manipulates the resistive shunt array and the cross-point switch matrix to select pairs of the four wires from the telephone base until the dial tone is sensed by the controller circuit. This determines which of the four wires from the telephone base are the two speaker wires. The cross point switch matrix is configured to couple the two speaker wires to a differential amplifier. The output of the differential amplifier is coupled to an attenuator circuit which selectively and incrementally attenuates the signal under control of the controller circuit. From the attenuator, the signal is amplified to an appropriate amplitude under control of an automatic level control circuit, forming a single-ended receive output signal. The resistive shunt array, cross-point switch matrix, differential amplifier, attenuator and automatic level control circuit comprise a receive signal path within the interface device.

The remaining two of the four wires are presumed to be the two microphone wires. The cross-point switch matrix and resistive shunt array are configured to transmit a signal on a selected one of these signal lines from a transmit signal path within the interface device, while the other of these two signal lines is configured as a transmit signal return. The transmit path comprises a pre-amplifier for receiving a transmit input signal, an expander level detection circuit and a voltage controlled amplifier (VCA) circuit coupled to the output of the pre-amplifier, an incrementally selectable attenuator (step attenuator) coupled to the VCA output, and finally, an output amplifier circuit coupled to the output of the step attenuator.

To calibrate the transmit path, a tone is generated from the controller circuit and applied to the transmit path via a calibration circuit coupled to the VCA and expander circuits. The controller circuit monitors the receive signal path; due to side tone characteristics existing at the handset port of the telephone set, the transmit path can be calibrated by monitoring the receive signal path. For this reason, the receive signal path is calibrated first. The elements of the transmit path are adjusted by the controller circuit according to the calibration signal to form a single-ended transmit output signal of an appropriate amplitude.

A pair of switching relays are provided for switching between coupling the handset and the two-wire analog telephone instrument to the handset jack of the telephone base. Each relay switches two of the four wires. A switch control circuit controls the position of the relays according to whether a DC current is drawn by the two-wire telephone instrument. If the instrument is off-hook, it will draw a DC current. In response to the off-hook condition, the controller circuit configures the switching relays to couple the two-wire telephone instrument to the handset jack of the telephone base and to decouple the handset from the handset jack. If the two-wire telephone instrument is on-hook, it will draw a negligible amount of DC current. In response to the on-hook condition, the controller circuit will configure the switching relays to couple the handset to the handset jack of the telephone base and to decouple the instrument from the handset jack.

BRIEF DESCRIPTION OF THE DRAWINGS

FIG. 6 illustrates switching algorithms for the system.

FIG. 7 is a continuation of the switching algorithms of FIG. 6.

DETAILED DESCRIPTION OF THE PREFERRED EMBODIMENT

Figure 1:
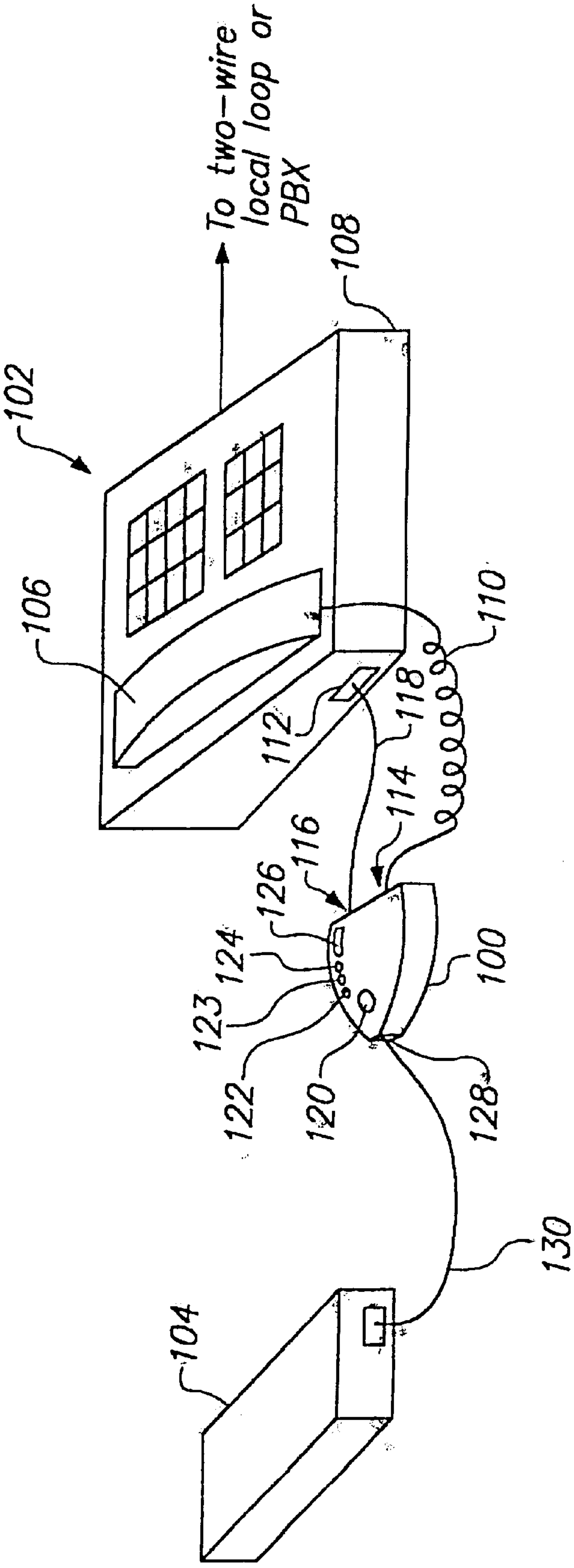
FIG. 1 illustrates a perspective view of the interface device according to the present invention coupled to a telephone set and to a two-wire analog telephone instrument.

FIG. 1 illustrates a perspective view of the interface device 100 according to the present invention coupled to a telephone set 102 and to a two-wire analog telephone instrument 104, such as a facsimile machine, fax modem, modem or teleconferencing device. The telephone set 102 includes a handset 106 and a telephone base 108. The telephone set 102 can be configured to interface with a two-wire local loop or with a private branch exchange (PBX). The handset 106 is normally connected via a handset cable 110 to a handset port 112 of the telephone base 108. In FIG. 1, however, the handset cable 110 is disconnected from the handset port 112 and coupled to the interface device 100 via a handset port 114 of the interface device 100. The handset port 112 of the telephone base 108 is coupled to a phone port 116 of the interface device 100 via a telephone base cable 118.

Located on the interface device 100 is a push-button 120, three diodes 122–124 and a slide switch 126, whose functions are explained herein. The two-wire telephone instrument 104 is coupled to a two-wire telephone instrument port 128 of the interface device 100 via a cable 130.

Figure 2:
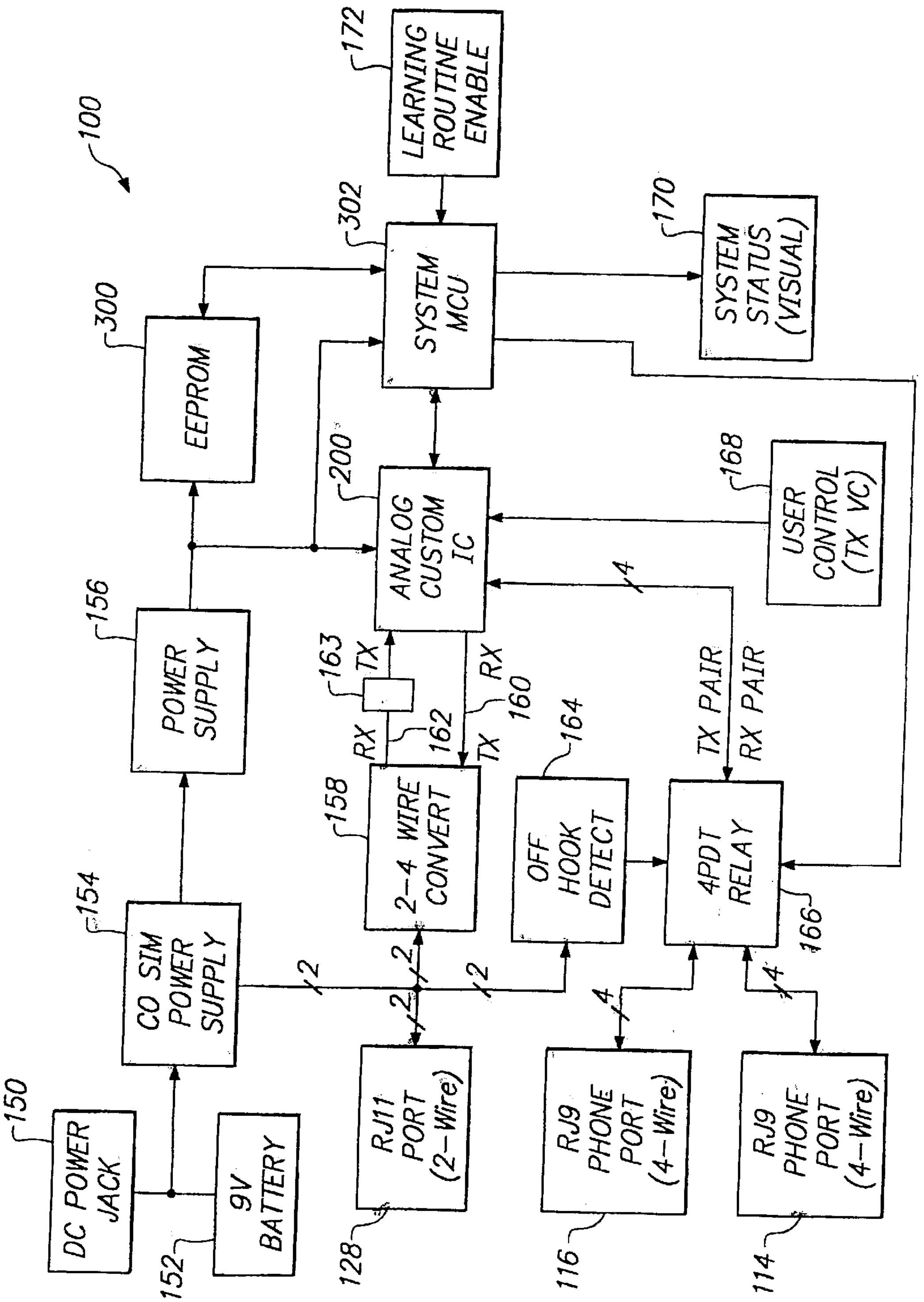
FIG. 2 illustrates a block schematic diagram of the interface device according to the present invention.

FIG. 2 illustrates a block schematic diagram of the interface device 100 according to the present invention. The handset port 114 preferably includes an RJ-9 jack provided for coupling the interface device 100 to the telephone handset 106 (FIG. 1) via the cable 110 (FIG. 1). The phone port 116 preferably includes an RJ-9 jack provided for coupling the interface device 100 to the telephone base 108 (FIG. 1) via the cable 118 (FIG. 1). The two-wire telephone instrument port 128 preferably includes an RJ-11 jack provided for coupling the interface device 100 to the two-wire telephone instrument 104 (FIG. 1) via the cable 130 (FIG. 1).

Power from an AC source is coupled to a DC power port 150 for providing power to the interface device 100 via an AC-to-DC power conversion circuit (not shown). A battery 152, such as a 9 volt battery, can also be coupled to provide power to the interface device 100. The battery 152 can be used to replace the AC source or can be used as a back-up in the event of power failure.

A first power supply 154 is coupled to receive power from one of the DC power port 150 or the 9 volt battery. The power supply 154 is coupled to the port 128 for providing power to the telephone instrument 104 (FIG. 1) by simulating a central office power supply. In addition, the power supply 154 is coupled for providing power to a second power supply 156. The power supply 156 is configured for supplying power to circuits of the interface device 100. In particular, the power supply 156 is coupled for providing power to an adaptive circuit 200, preferably a custom integrated analog circuit, to a memory 300, preferably an EEPROM, and to a controller circuit 302, preferably a digital micro-controller. In the preferred embodiment, the memory 300 is available from MicroChip under part number 93LC46. The digital controller 302, analog adaptive circuit 200 and memory 300 can preferably operate over a supply range of 3 to 5 volts DC.

The port 128 is also coupled to a two-to-four wire converter 158. The converter 158 converts the two-wire signals (bi-directional signal path) at the handset port 114 into separate transmit and receive signals paths 160, 162 (uni-directional signal paths). The signal paths 160, 162 is coupled to the adaptive circuit 200. In the preferred embodiment, the signal path 162 includes an automatic level control (ALC) circuit 163 which ensures that the signal provided via the path 162 does not exceed −40 dBV for the various DTMF, data or voice signals expected to be presented by the analog telephone instrument 104 through the port 128.

The four to two wire conversion is effected by applying a single-ended receive output signal from the adaptive circuit 200 into a transmit amplifier input contained within the two-to-four wire converter circuit 158. The output of this transmit amplifier places the receive signal onto the two-wire (tip-ring) lines at the interface port 128 (preferably RJ-11). This signal is, therefore, combined at the port 128 with the transmit output signal generated from a transmitter contained with the two-wire analog telephone instrument 104 (FIG. 1). The two-to-four wire converter 158 also contains a receiving amplifier which detects signals present on the two-wire (tip-ring) lines at the port 128. This receiving amplifier also contains a reference input from the transmit amplifier contained in the two-to-four wire converter 158 which is 180 degrees out of phase with the receive signal presented onto the two-wire (tip-ring) lines of the port 128. Consequently, the two-to-four wire receiving amplifier passes only the signal generated by the transmitter contained within the two-wire analog telephone instrument 104 (FIG. 1) and cancels the receive signal presented onto the two-wire (tip-ring) lines of the port 128. The output of the receiving amplifier contained within the two-to-four wire converter is then coupled to the input of the transmit channel of the adaptive circuit 200 for conditioning by the adaptive circuit 200 prior to driving the transmit lines of the four-wire phone port 116 coupled to the base 108 (FIG. 1) of the telephone set 102 (FIG. 1). The two-to-four wire converter 158 is preferably implemented as an integrated circuit, while the adaptive circuit 200 is preferably implemented as a custom integrated circuit. The two-to-four wire converter 158 and the two-wire analog telephone instrument 104 (FIG. 1) are preferably both powered by the central office simulator power supply circuit 154.

The port 128 is also coupled to an off-hook detector 164. The off-hook detector 164 senses whether the telephone instrument 104 (FIG. 1) coupled to the port 128 is on-hook or off-hook by sensing whether DC current is drawn from the port 128 by the telephone instrument 104 for controlling a four-pole-double-throw relay 166. The relay 166 is coupled to the handset port 114 via four conductors (two uni-directional signal paths). The relay 166 is also coupled to phone port 116 the via four conductors (two uni-directional signal paths). In addition, the relay 166 is coupled to the adaptive circuit 200 via four conductors (two uni-directional signal paths).

When the telephone instrument 104 (FIG. 1) is on-hook, the relay 166 couples each of the four wires of the handset port 114 to the respective wires of the phone port 116 and decouples the adaptive circuit 200 from the phone port 116. Accordingly, when the telephone instrument 104 is on-hook, the telephone base 108 is operatively coupled to the handset 106 (FIG. 1) via the relay 166. Further, when the telephone instrument 104 is on-hook, a signal path between the telephone instrument 104 and the telephone base 108 (FIG. 1) via the two-to-four wire converter 158 and the adaptive circuit 200 is interrupted by the relay 166.

Conversely, when the telephone instrument 104 is off-hook, the relay 166 couples each of the four wires of the phone port 116 to the adaptive circuit 200 and decouples the handset port 114 from the phone port 116. Accordingly, when the telephone instrument 104 is off-hook, the telephone base 108 is coupled to the telephone instrument 104 via a signal path which includes the two-to-four wire converter 158, the adaptive circuit 200 and the relay 166. Also, when the telephone instrument 104 is off-hook, a microphone and speaker within the handset are preferably inoperative.

The relay 166 is also controlled by the controller 302 under certain circumstances. In particular, the controller 302 manipulates the relay during execution of a learning technique explained herein.

A first user input 168 is coupled to the adaptive circuit 200. This input 168 preferably includes the slide switch 126 (FIG. 1) for providing the user with an ability to adjust the transmit volume for the transmit signal path through the adaptive circuit 200. The adaptive circuit 200 is also coupled to be controlled by the controller 302. The controller 302 can include a finite state machine or a micro-processor, though in the preferred embodiment, the controller 302 includes a digital micro-controller unit (MCU) which operates according to a stored software program. Parameters used by the controller 302 are stored in the memory 300. A status indicator 170 provides a visual indication of the operative status of the interface device 100, as explained in more detail herein. The indicator preferably includes the diodes 122–124. A second user input 172 to the controller 302 initiates a learning technique during which the interface device 100 adapts to the signal characteristics of the telephone set 102 (FIG. 1). The user input 172 preferably includes the push-button 120 (FIG. 1).

The interface device 100 preferably incorporates three different techniques for learning the characteristics of the four-wire interface found in most telephone sets: a self-contained technique which is executed under control of the controller 302; a technique which requires the user to dial a telephone number to couple the interface device 100 to an automated host system via the telephone base 108 (FIG. 1) which then controls the learning process; and a technique which requires the user to dial a telephone number and, then, a technician controls the learning process. The latter two of the three techniques are preferably used only if the self-contained technique is not completely successful.

Figure 3:
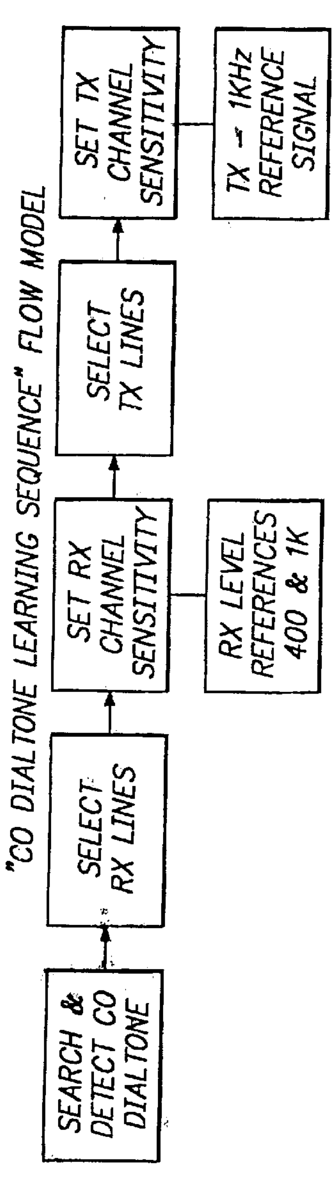
FIG. 3 illustrates a flow model of a "Central Office (CO) Dialtone Learning Sequence."

FIG. 3 illustrates a flow model of the self-contained technique ("CO Dialtone Learning Method"). This is the primary method the interface device 100 uses to "learn" the characteristics of the telephone interface. The "CO Dialtone Learning Method" is automatic and transparent to the end user.

Upon initial system power-up, such as the first time batteries are installed in the interface device 100, or upon the user pressing the push-button 120 (FIG. 1), a "CO Dialtone Search" routine is enabled to detect and locate a CO dialtone signal on any combination of the 4-wire interface lines from the telephone base unit 108 (at phone port 116). The telephone set 102 (FIG. 1) is taken off-hook, this causes an AC dial tone to appear across two of the four wires of the phone port 116 and causes the relay 166 to couple the four wires of the phone port 116 to the adaptive circuit 200. When the CO dialtone is detected, the "CO Dialtone Learning Method" will be fully enabled. Preferably, the only inputs required to initiate the learning process are pressing the push-button (or supplying power for the first time) and receiving a dialtone.

The "CO Dialtone Learning Method" is a one-time activation process. After a successful "learn sequence" has been executed, the appropriate bit addressable latch 1 (FIG. 10) settings are preferably read from the controller 302 and stored into the EEPROM 300, though other types of memory can be used. Subsequent CO dial tones will not enable the learning sequence unless a soft system reset is performed to re-enable the learning routine. The "CO Dialtone Learning Method" is re-enabled by a user depressing the push-button 120 (FIG. 1), preferably for a minimum of five seconds, or by a soft system reset which is accessed remotely.

The "CO Dialtone Learning Method" starts with the location of the CO dialtone. Location of the CO dialtone indicates the proper receive lines. The receive input step attenuator then adjusts the receive channel sensitivity based on reference levels as described below. The transmit lines are then selected and the transmit output step attenuator adjusts the transmit channel sensitivity based on reference levels.

Figure 4:
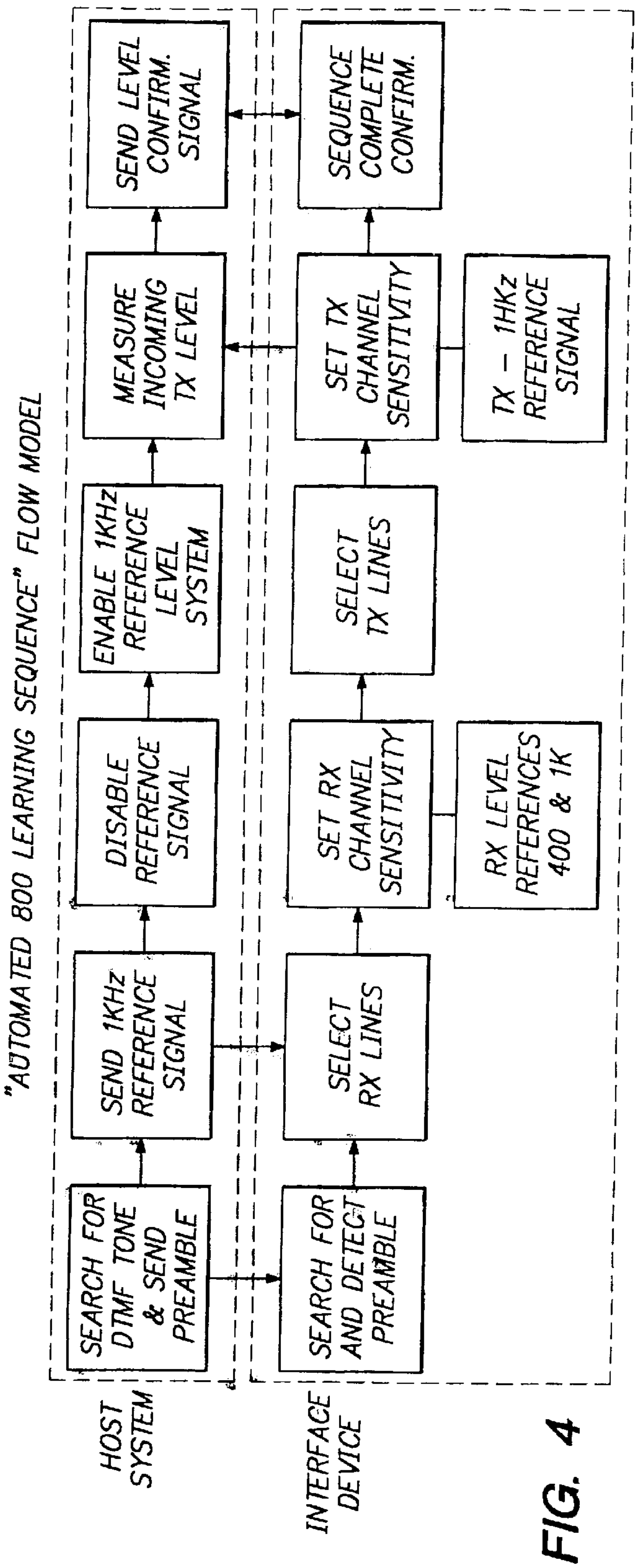
FIG. 4 illustrates a flow model of an "Automated 800 Learning Method."

FIG. 4 illustrates flow models for the technique which requires the user to dial a telephone number to couple the interface device 100 to an automated host system ("Automated 800 Learning Method"). Due to the lack of regulation as it relates to Key and PBX system station sets, there is a wide variation of side tone characteristics which may be encountered. Consequently, it is possible that occasionally, the learning method employed by the "CO Dialtone Learning Method" may not provide optimal overall performance of the interface device 100. The "Automated 800 Learning Method" provides a very accurate means for the interface device 100 to "learn" the characteristics of a 4-wire telephone port interface.

The "Automated 800 Learning Method" involves interaction between a "Host" system located at the termination of the accessed telephone line and the interface device 100 located at the end user's location. The user places a call to a designated telephone number and is greeted by an "automated attendant" message. The message instructs the user to momentarily depress the push-button 120 (FIG. 1) and, then, press a key on a keypad of the telephone set 102 (FIG. 1). The keystroke interrupts the "auto attendant" message and the "Host" sends a preamble to the interface device 100. When the preamble is detected, the "Automated 800 Learning Method" is enabled.

Figure 5:
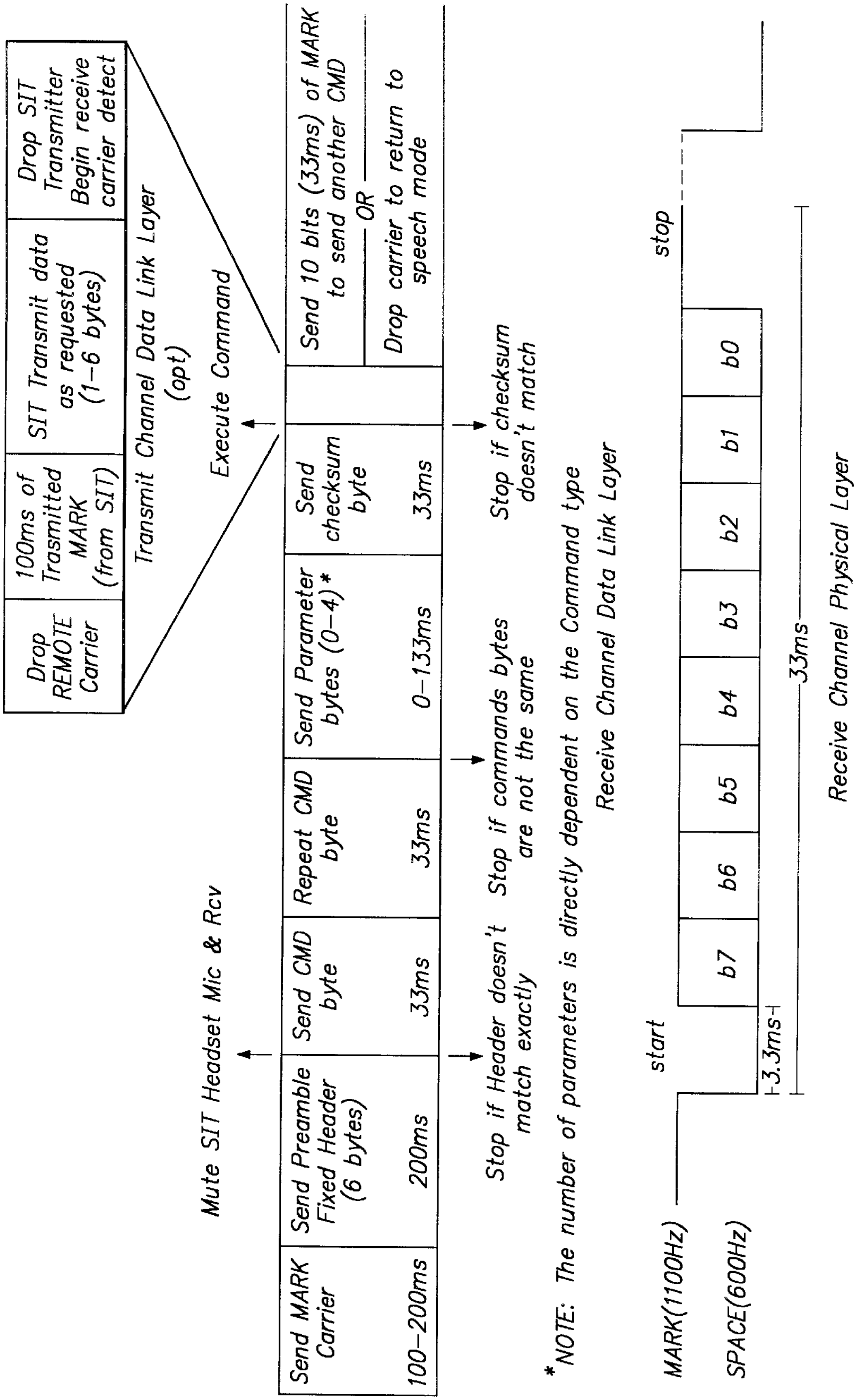
FIG. 5 illustrates a diagram of the SIT Data Transmission technique used for the "Automated 800 Learning Method" and "Manual 800 Learning Method" of the present invention.

The "Automated 800 Learning Method" interaction between the "Host" and interface device 100 is shown in the flow model illustrated in FIG. 4 and the "FSK Data Transmission Diagram" is illustrated in FIG. 5. Thus, an FSK modem is built into the interface device 100 for communication during the "Automated 800 Learning Method" or the "Manual 800 Learning Method." The "Host" sends a preamble, for a predetermined amount of time, to the interface device 100 to initiate the "Automated 800 Learning Method." The "Host" then sends a 1 KHz reference signal, for a predetermined amount of time, for setup/calibration of the interface device 100 which it compares to an internal reference and uses to ensure proper setup/calibration of the interface device 100 receive channel. The interface device 100 then sends a 1 KHz signal to the "Host" in incremental amplitudes. When the incoming 1 KHz reference level is appropriate, the "Host" sends a level confirmation signal to the interface device 100 and a final "handshake" is generated between the "Host" and interface device 100 signifying completion of the "Automated 800 Learning Method."

The "Automated 800 Learning Method" begins by searching for the preamble sent by the "Host." Once the preamble is located, the proper receive lines are located. The receive channel sensitivity is then adjusted in comparison to a receive level reference. Upon locating the proper receive lines, the transmit lines are selected and their sensitivity is adjusted in comparison to a transmit level reference signal.

A third and final interface method is the "Manual 800 Learning Method." This method is used when either of the previously described learning sequences fail to provide optimal performance with a particular telephone port interface. The "Manual 800 Learning Method" provides the user with the ability to interact with a trained telephony technician who has the ability to adjust virtually all of the interface device 100 parameters remotely with the use of a second "Host" system.

The "CO Dialtone Learning Method" and the "Automated 800 Learning Method" each select the most common configurations which satisfy the system's performance criteria. Occasionally this may not be the optimal "line configuration" selection for all interface environments. Since there are no regulatory requirements governing the specific characteristics for 4-wire handset port interfaces, there is a range of different configurations. It is not uncommon for an electronic telephone set to contain a handset port interface that will operate with multiple "line-configuration" settings. All of the configurations will provide acceptable system performance, occasionally however, a particular configuration will be more susceptible to unwanted radio-frequency interference or electromagnetic interference. In these cases, alternate combinations must be selected for optimal system performance.

Alternate combinations can be implemented by a user placing a call to a technical support staff member (tech) at a designated telephone number. After determining the problematic symptoms, the technician has the ability to enable the "CO Dialtone Learning Method," the "Automated 800 Learning Method" or the "Manual 800 Learning Method" modes of operation by sending the appropriate sequence preamble. In the "Manual 800 Learning Method" mode of operation, the technician can directly manipulate and change the parameters associated with the cross-point switch array 2, the receive input step attenuator RX-2 or the transmit output step attenuator TX-5 (FIGS. 9 and 10).

Figure 8:
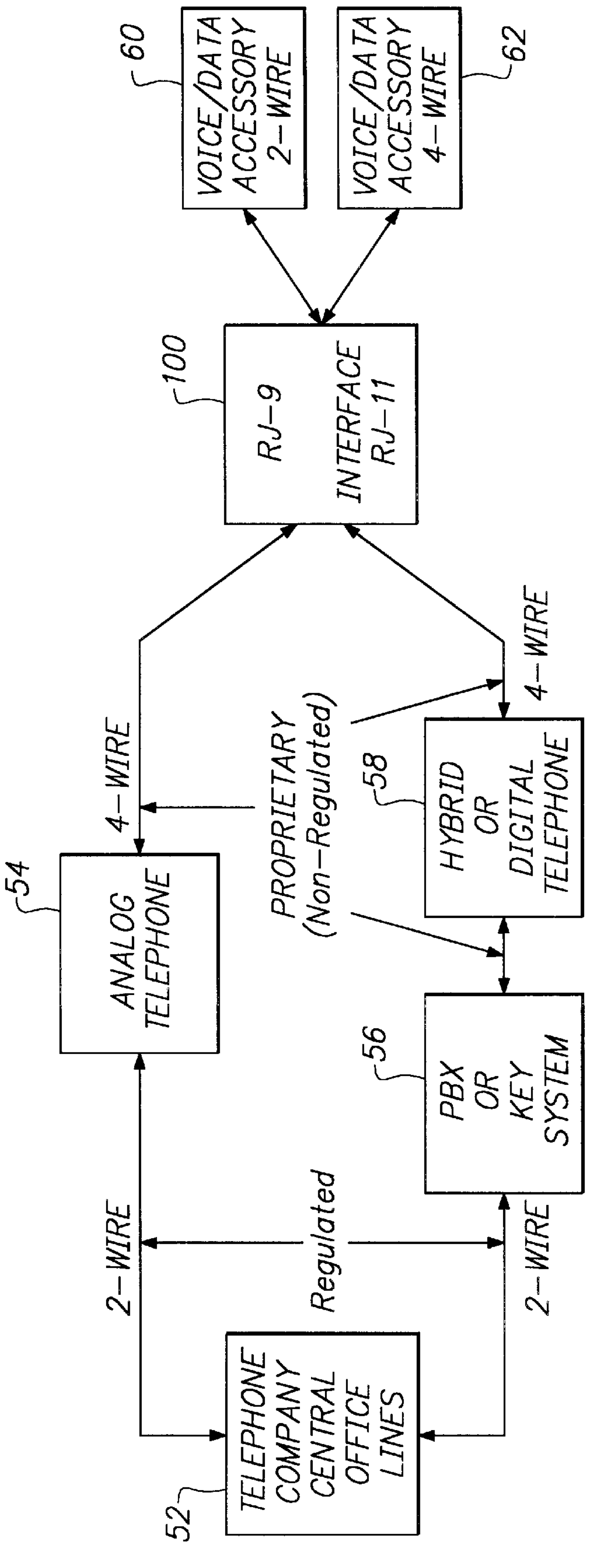
FIG. 8 illustrates a block diagram of the regulated and non-regulated portions of a typical telephone interface configuration as it relates to both the Central Office and the interface device of the present invention.

A block diagram of the regulated and non-regulated portions of a telephone interface configuration is illustrated in FIG. 8. The connection between the Central Office Lines of the telephone company 52 and either a telephone set 54 or a telephone system 56 is regulated. Accordingly, telephone sets and systems from many manufacturers can all be connected directly to the Central Office lines 52. The connection between a telephone system 56 and a hybrid or digital telephone set 58 is not regulated. The connection between a telephone set 54 or 58 and an accessory 60 or 62 is also not regulated. Therefore, unless designed to interface, one manufacturer's accessory may not operate with another manufacturer's telephone set.

The present invention provides the interface device 100 which provides an interface between telephone instruments 60 or 62 and telephone base units 54 or 58, having different protocols. The interface device 100 allows a voice/data accessory 60 or 62 to be used with telephone base units 54 and 58 from multiple manufacturers, each having different protocols. Note that if the telephone instrument is a four-wire device 62, then the two-to-four wire converter 158 (FIG. 2) is unnecessary.

Figure 9A:
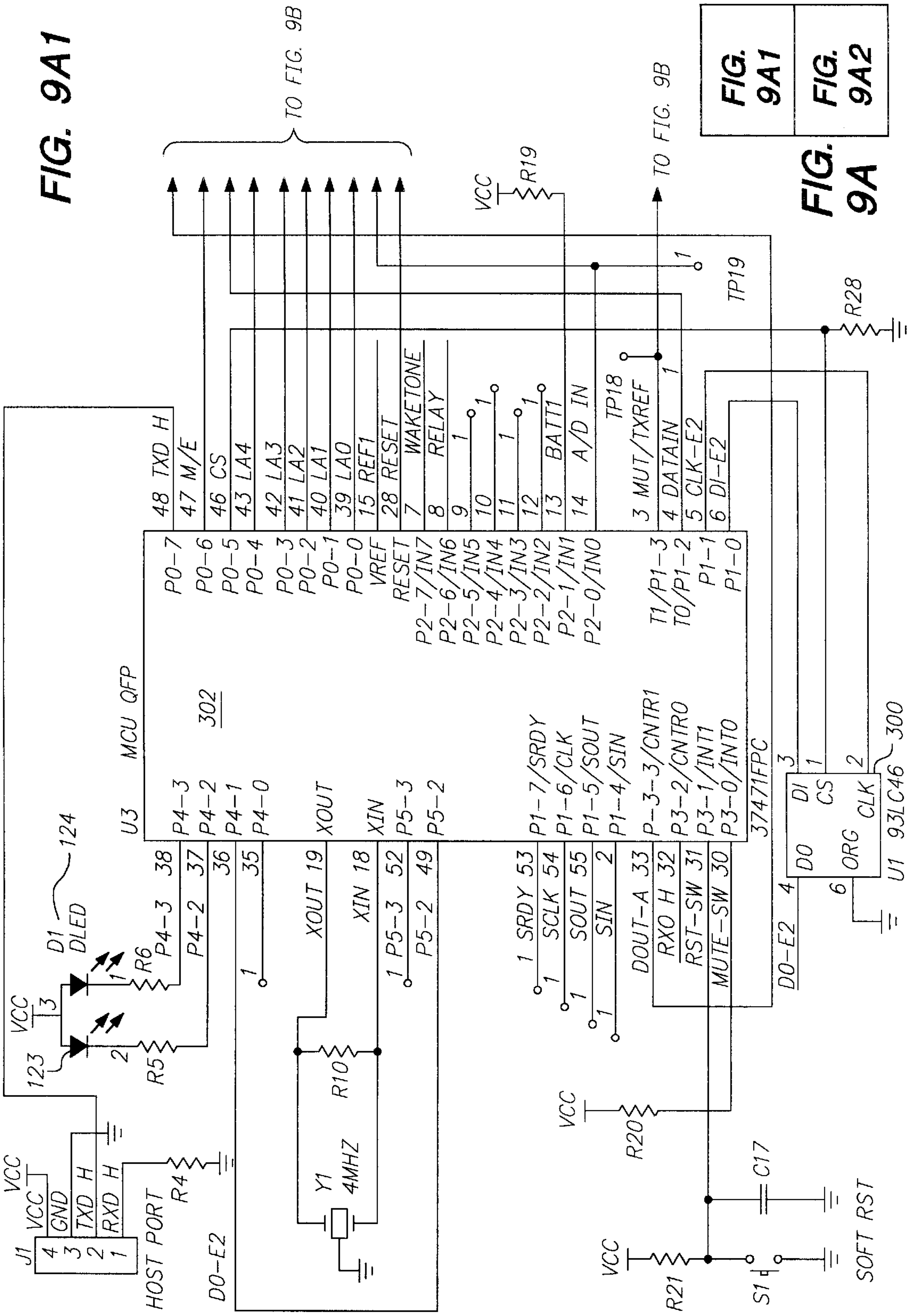
FIGS. 9A and 9B illustrates a block schematic diagram of the interface device including a full-custom analog and semi-custom digital microcontroller integrated circuit.
Figure 9B:
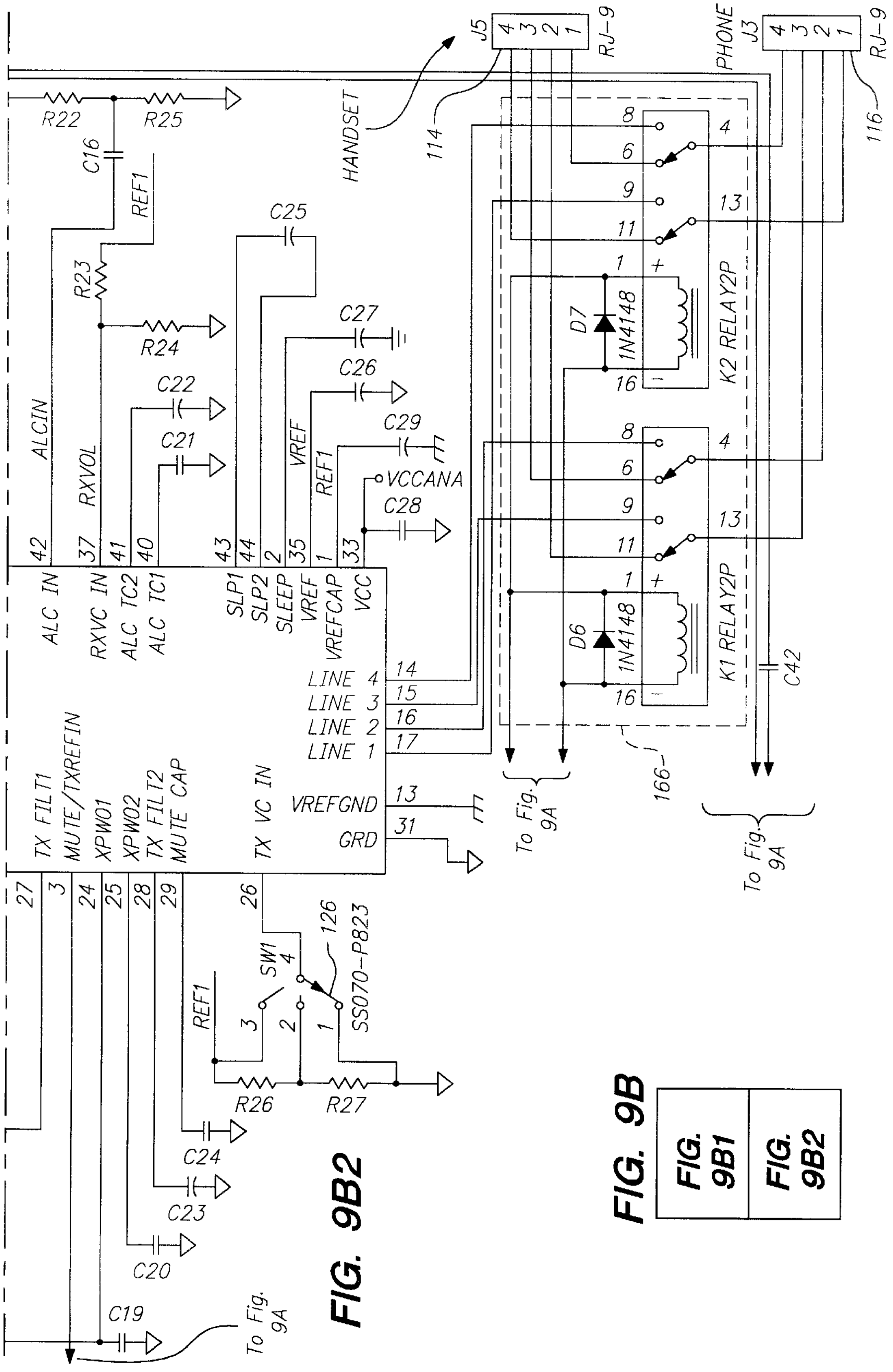
Figure 10:
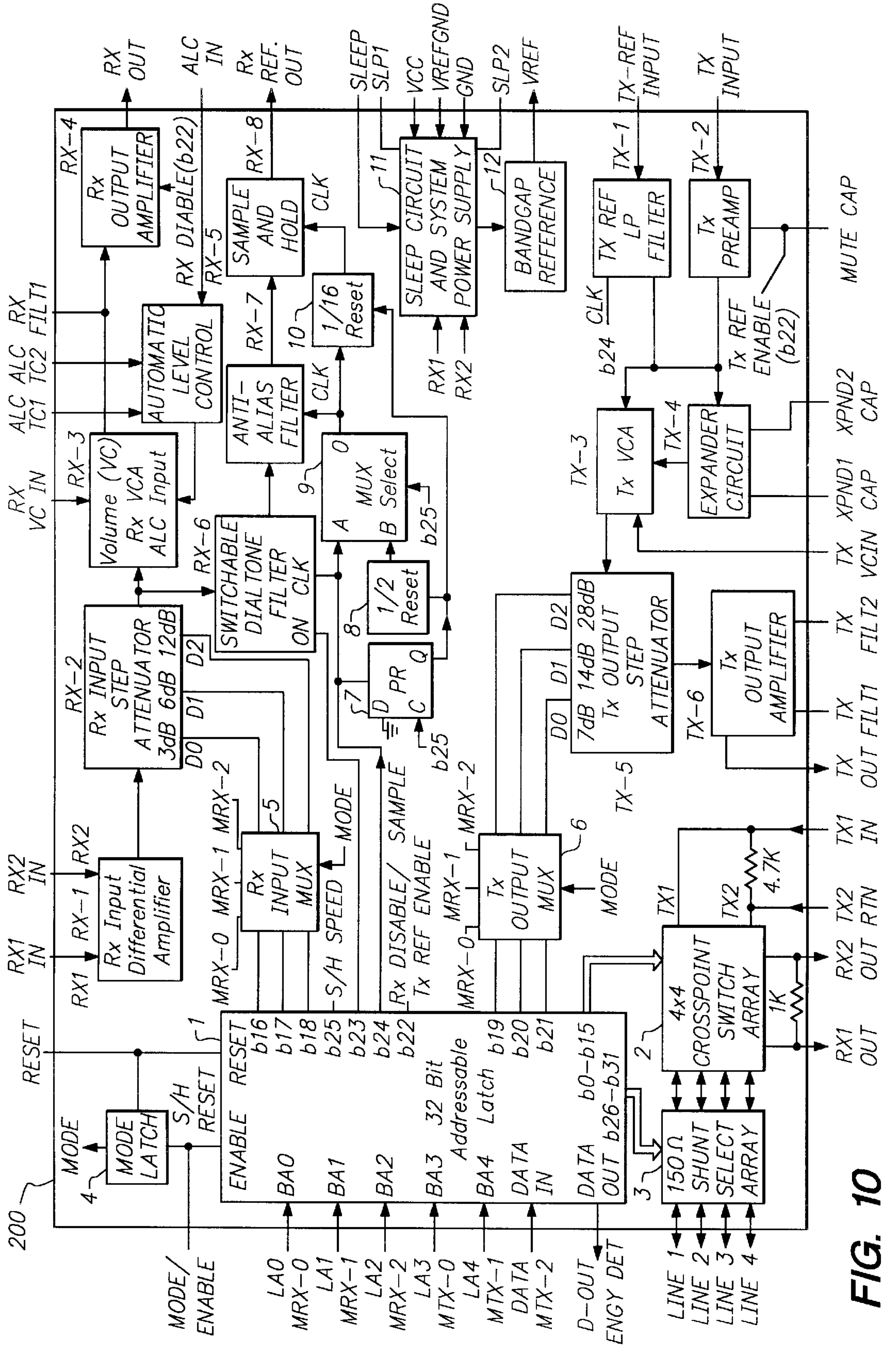
FIG. 10 illustrates a block diagram of the full-custom analog integrated circuit of the present invention.

A block schematic diagram of the interface device 100 system of the present invention is illustrated in FIG. 9. The preferred embodiment of the interface device 100 includes a full-custom analog integrated adaptive circuit 200, a semi-custom digital microcontroller (MCU) 302, a 1-K serial EEPROM 300, an integrated circuit two-to-four wire converter 158, a four-wire telephone handset port 114 for coupling to a telephone handset 106 (FIG. 1), a four-wire phone port 116 for coupling to a telephone base 108 (FIG. 1), a two-wire telephone instrument port 128 for coupling to a two-wire analog telephone instrument 104 (FIG. 1) and additional elements described in more detail below. The two-to-four wire converter circuit 158 is preferably an integrated circuit available under part number TEA1061 from Philips Electronics, though it will be apparent that another two-to-four wire converter, such as a another type of active converter or a transformer, can be substituted with appropriate modifications.

A first terminal of the DC power port 150 is coupled to a first terminal of a voltage regulator U6 and to a first terminal of capacitor C48. An output terminal of the voltage regulator U6 is coupled to a first terminal of a capacitor C30, to a first terminal of a resistor R29, to a first terminal of a resistor R30, to a supply terminal of a comparator U5B, to a first terminal of a capacitor C35, to an emitter of a pnp bipolar transistor Q2, to a cathode of a diode D6, to a cathode of a diode D7, and to a first coil terminal of the relay K1, to a first coil terminal of the relay K2, and to an input terminal of a voltage regulator U4. An output terminal of the voltage regulator U4 forms a supply node, Vcc, for supplying power to various other elements of the interface device 100, and which is coupled to first terminals of filter capacitors C31–C34.

A ground terminal of the DC power port 150, a second terminal of the capacitor C48, a ground terminal of the voltage regulator U6, a second terminal of the capacitor C30, a second terminal of the capacitor C35 and a ground terminal of the voltage regulator U4 are each coupled to a first ground node. A second terminal of the capacitors C31, C32 and C34 are coupled to a second ground node. A second terminal of the capacitor C33 is coupled to a third ground node. A resistor R44 is coupled between the first ground node and the second ground node. A resistor R51 is coupled between the second ground node and the third ground node.

A first terminal of the two-wire telephone instrument port 128 is coupled to a first terminal of a resistor R49. A second terminal of the resistor R49 is coupled to a second terminal of the resistor R29 and to a first terminal of a resistor R33.

The voltage regulator U6 preferably provides a regulated voltage of approximately 10 volts DC which when supplied through a 147 ohm resistance (provided by R29 and R49) simulates the power typically supplied by a central office. This ensures that the power requirements of the telephone instrument 104 (FIG. 1) are met. The voltage regulator U4 preferably provides a regulated voltage of approximately 4 volts DC for Vcc.

A second terminal of the resistor R33 is coupled to a first terminal of a resistor R38, to an LN (positive line) terminal of the converter 158, and to a first terminal of a resistor R36. A second terminal of the resistor R38 is coupled to a first terminal of a capacitor C40 and to a first terminal of a resistor R39. A second terminal of the capacitor C40 is coupled to an IR (receiving amplifier input) terminal of the converter 158. A second terminal of the resistor R39 is coupled to a first terminal of a resistor R46 and to a first terminal of a resistor R47. A second terminal of the resistor R46 is coupled to a SLPE (DC resistance adjustment) terminal of the converter 158, to a first terminal of a capacitor C44, to a first terminal of a resistor R48 and to a non-inverting input of the comparator U5B.

A second terminal of the capacitor C44 is coupled to a first terminal of a resistor R40 and to a GAS1 (transmitting amplifier gain adjustment) terminal of the converter 158. A second terminal of the resistor R40 is coupled to a GAS2 (transmitting amplifier gain adjustment) terminal of the converter 158. A GAR (receiving amplifier gain adjustment) terminal of the converter 158 is coupled to a first terminal of a resistor R41, to a first terminal a capacitor C43 and to a first terminal of a capacitor C47. A MIC− (inverting microphone input) terminal of the converter 158 is coupled to a first terminal of a capacitor C46. A STB (current stabilizer) terminal of the converter 158 is coupled to a first terminal of a resistor R50. A REG (voltage regulator decoupling) terminal of the converter is coupled to a first terminal of a capacitor C45.

A second terminal of the port 128, a second terminal of the resistor R47, a second terminal of the resistor R48, a VEE (negative line) terminal of the converter 158, a second terminal of the resistor R50 and a second terminal of the capacitors C45 and C47 are coupled to the first ground node. A second terminal of the capacitor C46 is coupled to the third ground node. A second terminal of the resistor R36 is coupled to a VCC (positive supply decoupling) terminal of the converter 158, to a first terminal of a capacitor C39.

A second terminal of the resistor R30 is coupled to an inverting input of the comparator U5B, to a first terminal of a resistor R35, and to a first terminal of a capacitor C38. A second terminal of the resistor R35, a second terminal of the capacitor C36, a ground terminal of the comparator U5B and a second terminal of the capacitor C39 are coupled to the first ground node.

An output of the comparator U5B is coupled to a first terminal of a resistor R31 and to a first terminal of a resistor R34. A second terminal of the resistor R31 is coupled to a base terminal of the transistor Q2. A collector of the transistor Q2 is coupled to a first terminal of a resistor R32. A second terminal of the resistor R32 is coupled to an anode of the light emitting diode 122, which preferably emits green light. A cathode of the diode 122 is coupled to the first ground node. A second terminal of the resistor R34 is coupled to a base terminal of a pnp bipolar transistor Q3. An emitter of the transistor Q3 is coupled to a collector of an npn bipolar transistor Q4, to an anode of the diode D6, to an anode of the diode D7, to a second coil terminal of the relay K1 and to a second coil terminal of the relay K2.

A collector of the transistor Q3 and an emitter of the transistor Q4 are coupled to the ground node. A base terminal of the transistor Q4 is coupled to a first terminal of a resistor R37. A second terminal of the resistor R37 is coupled to a RELAY terminal of the controller 302. The transistor Q4 allows the controller 100 to manually activate the relays K1 and K2, when necessary. This can be done, for example, during execution of a learning technique or for testing purposes.

The adaptive circuit 200, at Lines 2 and 3, is coupled to two switched terminals of the relay K1 and, at Lines 1 and 4, to two switched terminals of the relay K2. Terminals 2 and 3 of the handset port 114 are coupled to two alternate switched terminals of the relay K1 and terminals 1 and 4 of the port 114 are coupled to two alternate switched terminals of the relay K2. Terminals 2 and 3 of the phone port 116 are coupled to two non-switched terminals of the relay K1 and terminals 1 and 4 of the port 116 are coupled to two non-switched terminals of the relay K2.

The relay 166 (FIG. 2) includes the relays K1 and K2. When a telephone instrument 104 (FIG. 1) coupled to the port 128 is on-hook, the output of the comparator U5B is a logical high voltage. Accordingly, the transistor Q3 is off and little or no current flows in the coils of the relays K1 and K2. Therefore, when the telephone instrument 104 is on-hook, the relays K1 and K2 are in the position shown in FIG. 9 where the four wires from the telephone base 108 are coupled to the corresponding four wires of the handset 106. Also, because Lines 1–4 from the adaptive circuit 200 are interrupted by the relays K1 and K2, the telephone instrument 104 is decoupled from the base unit 108.

When the telephone instrument 104 is off-hook, a DC current is drawn by the telephone instrument 104 from the port 128. This decreases the voltage level of the non-inverting input of the comparator U5B. Therefore, the output of the comparator U5B becomes a logical low voltage. This turns on the transistor Q2 and illuminates the diode 122. The output of the comparator U5B also turns on the transistor Q3, causing a current to flow in the coils of the relays K1 and K2 which changes the state of the relays K1 and K2. Accordingly, when the telephone instrument 104 is off-hook, the four lines from the telephone base 108 are coupled to the telephone instrument 104 via the adaptive circuit 200. This interface allows for the establishment and selection of the two-wire each send (Tx) and receive (Rx) line pairs from the telephone base port 112 (FIG. 1). In addition, when the telephone instrument 104 is off-hook, the handset 106 is decoupled from the telephone base 108.

A QR+ (non-inverting output) terminal of the converter 158 is coupled to a second terminal of the resistor R41, to a second terminal of the capacitor C43, to a first terminal of a capacitor C4 and to a first terminal of a capacitor C52. A second terminal of the capacitor C52 is coupled to an AMP 1R3 IN terminal of the ALC circuit 163. In the preferred embodiment, the ALC circuit 163 is part number SA571D, available from Philips Electronics.

A second terminal of the capacitor C4 is coupled to a first terminal of a resistor R9. A second terminal of the resistor R9 is coupled to an inverting input of an amplifier U5A, to a first terminal of a resistor R7 and to a first terminal of a capacitor C2. A non-inverting input of the amplifier U5A is coupled to a first terminal of a capacitor C9, to a first terminal of a resistor R15 and to a first terminal of a resistor R16. A second terminal of the capacitor C9 and a second terminal of the resistor R15 are coupled to the third ground node. A second terminal of the resistor R16, a Vcc terminal of the ALC circuit and a first terminal of a capacitor C49 are coupled to the supply voltage Vcc. A second terminal of the capacitor C49 is coupled to the first ground node.

An output of the amplifier U5A is coupled to a second terminal of the capacitor C2, to a second terminal of the resistor R7 and to a first terminal of the capacitor C50. A second terminal of the capacitor C50 is coupled to a first terminal of a resistor R53 and to a Rect IN 1 terminal of the ALC circuit 163. A second terminal of the resistor R53 is coupled to the first ground node.

An AMP 2 R3 IN terminal of the ALC circuit 163 is coupled to a first terminal of a capacitor C55. A Rect Cap 1 terminal of the ALC circuit is coupled to a first terminal of a capacitor C56. A THD 1 terminal of the ALC circuit 163 is coupled to a first terminal of a capacitor C57. A THD 2 terminal of the ALC circuit 163 is coupled to a first terminal of a capacitor C58. A. Rect Cap 2 terminal of the ALC circuit 163 is coupled to a first terminal of a capacitor C59. A Rect IN 2 terminal of the ALC circuit 163 is coupled to a first terminal of a resistor R56. A second terminal of the capacitors C55–C59, a second terminal of the resistor R56 and a GND terminal of the ALC circuit 163 are coupled to the first ground node.

An OUT 1 terminal of the ALC circuit 163 is coupled to a first terminal of a capacitor C51, to a first terminal of a capacitor C53, to a first terminal of a resistor R54 and to a first terminal of a capacitor C42. A second terminal of the capacitor C51 is coupled to a Gain Cell IN terminal of the ALC circuit 163. A second terminal of the resistor R54 is coupled to a first terminal of a resistor R55 and to a first terminal of a capacitor C54. A second terminal of the capacitor C53 and a second terminal of the resistor R55 are coupled to a –IN 1 terminal of the ALC circuit. A second terminal of the capacitor C54 is coupled to the first ground node. An OUT 2 terminal of the ALC circuit is coupled to a –IN 2 terminal of the ALC circuit 163.

A second terminal of the capacitor C42 is coupled to a TX INPUT (transmit input) terminal of the adaptive circuit 200. A MIC+ (non-inverting microphone input) of the converter 158 is coupled to a first terminal of a capacitor C41. A second terminal of the capacitor C41 is coupled to a first terminal of a resistor R22, to first terminal of a capacitor C14 and to a RX OUT (output) terminal of the adaptive circuit 200. A second terminal of the resistor R22 is coupled to a first terminal of a resistor R25 and to a first terminal of a capacitor C16. A second terminal of the resistor R25 is coupled to the third ground node. A second terminal of the capacitor C16 is coupled to an ALC IN (automatic level control) terminal of the adaptive circuit 200.

The two-to-four wire converter 158 converts a bi-directional signal at its IR terminal (from the port 128) into a pair of unidirectional signals at its MIC+ (input) and QR+ (output) terminals). The two-four wire converter 158 separates the bi-directional transmit and receive signals present at the LN terminal of the converter circuit 158 (the transmit signal is from the port 128, while, the receive signal is from the adaptive circuit 200. The transmit signal from port 128 is coupled into a receiving amplifier within the converter 158 via the IR input terminal of the converter 158. The amplified unidirectional signal output from this amplifier is presented at the QR+ output terminal of the converter 158. The single-ended unidirectional receive output signal from the adaptive circuit 200 is applied to a transmit amplifier within the converter 158 via the MIC+ input terminal of the converter 158. The output of this amplifier appears at the LN terminal of the converter 158 as a receive signal for the telephone instrument 104 (FIG. 1) coupled to the port 128.

The two-to-four wire conversion is accomplished because the receiving amplifier (at the IR input terminal of the converter 158) also obtains a reference input from the transmit amplifier (at the MIC+ input terminal of the converter 158) which is 180 degrees out of phase with the output signal at the LN terminal of the converter 158 thereby effectively cancelling the converter 158 transmit amplifier signal and passing only the signal received via the port 128 from the telephone instrument 104 (FIG. 1). The unidirectional signals are coupled to the adaptive circuit 200 at its RX OUT (output) and TX INPUT (input) terminals, respectively. The output RX OUT is also coupled to an input ALC IN of the adaptive circuit 200. As explained in more detail in reference to FIG. 10, an automatic level control (ALC) block RX-5 within the adaptive circuit 200 acts as a compressor for large, potentially harmful, signals.

An RX1 OUT terminal of the adaptive circuit 200 is coupled to a first terminal of a resistor R11, to a first terminal of a resistor R51 and to a first terminal of a capacitor C12. A second terminal of the capacitor C12 is coupled to a RX1 IN terminal of the adaptive circuit 200. An RX2 OUT terminal of the adaptive circuit 200 is coupled to a second terminal of the resistor R11, to a first terminal of a resistor R52 and to a first terminal of a capacitor C8. A second terminal of the capacitor C8 is coupled to RX2 IN terminal of the adaptive circuit 200. A second terminal of the resistor R51 is coupled to a second terminal of the resistor R52 and to a first terminal of a capacitor C3.

A second terminal of the capacitor C3 is coupled to a first terminal of a resistor R8. A second terminal of the resistor R8 is coupled to a WAKETONE terminal of the controller 302. To conserve power when operating from battery power, the controller 302 enters a sleep mode when not in use, such as when the telephone set 102 is not in use. When operating with line power (not from batteries) the sleep mode can be deactivated. The controller 302 generates an ultrasonic frequency signal (at approximately 24 KHz) which notifies the adaptive circuit 200 via the WAKETONE terminal the to become active. In addition, the signals received from the telephone set 102 are re-applied to the adaptive circuit via its RX1 IN and RX2 IN terminals.

An RX VC IN terminal of the adaptive circuit 200 is coupled to a first terminal of a resistor R23 and to a first terminal of a resistor R24. A second terminal of the resistor R23 is coupled to a VREFCAP terminal of the adaptive circuit 200, to a first terminal of a capacitor C29, to a first terminal of a resistor R26, to a first switched terminal of a switch 126 and to a REF 1 terminal of the controller 302. A second terminal of the resistor R24 is coupled to the third ground node. A second terminal of the capacitor C29 is coupled to the first ground node.

The RX VC IN terminal is a DC control voltage input for the receive channel voltage controlled amplifier (VCA) circuit RX-3 (FIG. 10). The gain of the VCA circuit RX-3 is determined DC level presented to the RX VC IN terminal and is referenced to a 2.25 VDC reference level (REF1) generated by the adaptive circuit 200. Preferably, the gain of the VCA circuit RX-3 is fixed by the resistive divider of R26 and R27, though the gain could be configured to be user adjustable with appropriate modifications (e.g. including a potentiometer).

An SLP1 terminal of the adaptive circuit 200 is coupled to a first terminal of a capacitor C25. An SLP2 terminal of the adaptive circuit 200 is coupled to a second terminal of the capacitor C25. A SLEEP terminal of the adaptive circuit 200 is coupled to a first terminal of a capacitor C27. A second terminal of the capacitor C27 is coupled to the second ground node. The capacitor C27 sets a period of inactivity of the adaptive circuit 200 before entering a sleep mode for conserving power.

An ALC TC1 terminal of the adaptive circuit 200 is coupled to a first terminal of a capacitor C21. An ALC TC2 terminal of the adaptive circuit 200 is coupled to a first terminal of a capacitor C22. A second terminal of the capacitor C21 and a second terminal of the capacitor C22 are coupled to the third ground node. The capacitors C21 and C22 set time constants for an automatic level control (ALC) block RX-5 (FIG. 10) within the adaptive circuit 200.

A VREF terminal of the adaptive circuit 200 is coupled to a first terminal of a capacitor C26. A VCC terminal of the adaptive circuit 200 is coupled to a first terminal of a capacitor C28. An XPND1 terminal of the adaptive circuit 200 is coupled to a first terminal of a capacitor C19 and to a first terminal of a resistor R57. An XPND2 terminal of the adaptive circuit 200 is coupled to a first terminal of a capacitor C20. A TX FILT2 terminal of the adaptive circuit 200 is coupled to a first terminal of a capacitor C23. A MUTE CAP terminal of the adaptive circuit 200 is coupled to a first terminal of a capacitor C24. A second terminal of the capacitors C19–C26 and C28 are coupled to the third ground node. A second terminal of the resistor R57 is coupled to Vcc.

An XPDCAP terminal of the adaptive circuit 200 is coupled to a first terminal of a capacitor C11. A TX2 RET terminal of the adaptive circuit 200 is coupled to a first terminal of a capacitor C13 and to a first terminal of a resistor R18. A second terminal of the resistor R18 is coupled to a first terminal of capacitor C24A1, to a first terminal of a capacitor C24B1 and to a TX1 IN terminal of the adaptive circuit 200. A second terminal of the capacitors C24A1 and C24B1 are coupled to a first terminal of a capacitor C15 and to a TX OUT terminal of the adaptive circuit 200. A second terminal of the capacitor C15 is coupled to a TX FILT1 terminal of the adaptive circuit 200. A second terminal of the capacitors C11 and C13 are coupled to the third ground node.

Timing capacitors C11, C19–C22, C25 and C27 are coupled to various blocks within the adaptive circuit 200 and control the various attack and release times associated with expander, compressor and sleep blocks of the adaptive circuit 200. Filter and coupling capacitors C13–C15, C23, C24A1 and C24B1 are coupled to the receive and transmit channel amplifiers to set channel frequency response characteristics. Blocking capacitors C24, C26, C28 and C29 prevent certain signal frequencies from interfering with operation of the adaptive circuit 200.

A second terminal of the resistor R26 is coupled to a first terminal of a resistor R27 and to a second switched terminal of the switch 126. A second terminal of the resistor R27 is coupled to the third ground node and to a third switched terminal of the switch 126. A non-switched terminal of the switch 126 is coupled to a TX VC IN terminal of the adaptive circuit 200 for adjusting the transmit volume. The transmit volume control switch 126 is used as a fine tuning adjustment for precise level matching of the transmitted signal with the telephone set 102. The transmit volume is preferably adjustable in three increments, two of Which depend upon the switch position and upon the level of the REF1 signal provided by the VREF terminal of the controller 302. In particular, when REF1 is coupled directly to the TX VC IN terminal, this results TX VC IN being at 2.25 VDC for a minimum volume level, and when the TX VC IN terminal is coupled to ground, this results in a maximum volume level.

A DATA OUT terminal of the adaptive circuit 200 is coupled to a DOUT-A terminal of the controller 302. A DATA IN terminal of the adaptive circuit 200 is coupled to a DATA IN terminal of the controller 302. A MODE/ENABLE terminal of the adaptive circuit 200 is coupled to an M/E terminal of the controller 302 and to a first terminal of a resistor R17. A second terminal of the resistor R17 is coupled to the second ground node. A LA4 terminal of the adaptive circuit 200 is coupled to a LA4 terminal of the controller 302. A LA3 terminal of the adaptive circuit 200 is coupled to a LA3 terminal of the controller 302. A LA2 terminal of the adaptive circuit 200 is coupled to a LA2 terminal of the controller 302. A LA1 terminal of the adaptive circuit 200 is coupled to a LA1 terminal of the controller 302. A LA0 terminal of the adaptive circuit 200 is coupled to a LA0 terminal of the controller 302.

The controller 302 selects bits of an addressable latch 1 (FIG. 10) within the adaptive circuit 200 via the LA0–LA4 terminals. The MODE/ENABLE signal allows the controller 302 to select between writing to, or reading from, the latch 1. The controller 302 reads data out of the latch 1 via the DATA OUT terminal. The controller 302 writes data into the latch 1 via the DATA IN terminal.

An RX REF OUT terminal of the adaptive circuit 200 is coupled to an A/D IN (analog/digital) input of the controller 302 to provide a sample of the input signal which the adaptive circuit 200 receives from the telephone base 108 (FIG. 1). The controller 302 uses this information to determine if the appropriate line configuration has been selected and to control the receive and transmit channel sensitivities.

A RESET input of the controller 302 and a RESET input of the adaptive circuit 200 are coupled to a power-on reset circuit and switch 250. The power-on reset circuit 250 includes resistors R1–R3, capacitor C1 and pnp bipolar transistor Q1. A first terminal of the resistor R1 is coupled to the RESET terminals and to a collector of the transistor Q1. An emitter of the transistor Q1 is coupled to a first terminal of the resistor R2 and to a first terminal of the capacitor C1. A base terminal of the transistor Q1 is coupled to a second terminal of the resistor R2, to a second terminal of the capacitor C1 and to a first terminal of the resistor R3. A second terminal of the resistor R1 and a second terminal of the resistor R3 are coupled to the second ground node. The reset input 250 is activated upon power-up of the interface device 100, such as when power is removed and, then, reapplied. As explained below, this resets the interface device 100 in the event that a failure mode is entered due to a learning technique that was not successful.

A TX REF IN terminal of the adaptive circuit 200 is coupled to a TX REF terminal of the controller 302. The signal TX REF from the controller 302 allows the controller 302 to provide a 1 KHz calibration transmit tone, through the adaptive circuit 200, to facilitate the appropriate selections of the transmit lines and transmit channel sensitivity setting. The TX REF IN terminal of the adaptive circuit 200 is also the input terminal for the FSK modem contained within the adaptive circuit 200 which is utilized for communication with a "Host" during performance of the "Manual 800 Learning Method" and during the "Automated 800 Learning Method."

A host port jack J1 for serially coupling the interface device to a host system or local computer, includes four pins. The host port jack can be used, for example, for controlling system parameters and obtaining performance data from the system during computerized manufacturing system tests. A first pin of the jack J1 is coupled to a first terminal of a resistor R4. A second terminal of the resistor is coupled to the second ground node. A second pin of the jack J1 is coupled to a TXD_H terminal of the controller 302. A third pin of the jack J1 is coupled to the second ground node. A fourth pin of the jack J1 is coupled to VCC.

An anode of a green light emitting diode 123 and an anode of a red/orange light emitting diode 124 are coupled to VCC. A cathode of the diode 124 is coupled to a first terminal of a resistor R6. A second terminal of the resistor R6 is coupled to a pin 36 of the controller 302. A cathode of the diode 123 is coupled to a first terminal of a resistor R5. A second terminal of the resistor R5 is coupled to a pin 37 of the controller 302. In the preferred embodiment, the diodes 123, 124 are integrated in a single device package.

The diodes 123 and 124 are normally off except during execution of the learning process or upon failure of the learning process to properly configure the interface device 100. When the push-button 120 is depressed for five seconds, the green diode 123 begins flashing approximately twice per second to so indicate. If the learning process has failed to properly configure the adaptive circuit 200, the interface device enters an error mode wherein the red/orange diode 124 flashes to so indicate. The interface device 100 is reset by the reset circuit 250 to exit the error mode. Then, it is expected that execution of one of the other learning techniques (the "Automated 800 Method" and "Manual 800 Method") would result in a properly configured interface device 100 for the particular telephone set being used.

A D1-E2 terminal of the controller 302 is coupled to a DI terminal (data in) of a 1K serial memory device 300. In the preferred embodiment, the memory device 300 is EEPROM, though it will be apparent that another type of memory could be utilized. A CLK-E2 terminal of the controller 302 is coupled to a clock input CLK of the memory 300. A CS terminal of the controller 302 is coupled to a CS terminal of the memory 300 and to a first terminal of a resistor R28. A second terminal of the resistor R28 and an ORG terminal of the memory 300 are coupled to the second ground node. An output terminal DO (data out) of the memory U4 is coupled to a DO-E2 terminal of the controller 302.

An XOUT terminal of the controller 302 is coupled to a first terminal of a resistor R10 and to a first terminal of an oscillator Y1. A second terminal of the resistor R10 and a second terminal of the oscillator Y1 are coupled to a XIN terminal of the controller. A ground terminal of the oscillator Y1 is coupled to the second ground terminal. The oscillator Y1 is preferably crystal oscillator which generates a clock signal of 4 MHz for controlling the overall system timing of the interface device 100.

In an alternate embodiment, the oscillator Y1 is utilized only during execution of a learning procedure, while a second oscillator Y2 which generates a clock signal of approximately 32.7 KHz is utilized for controlling the overall system timing of the interface device 100 during other periods. Use of this slower clock reduces power consumption. In the preferred embodiment, SRDY, SCLK, SOUT and SIN terminals of the controller 302 are not utilized.

A RST-SW terminal of the controller 302 is coupled to a first terminal of a resistor R21, to a first terminal of a capacitor C17 and to a first terminal of a reset switch S1. A second terminal of the resistor R21 is coupled to the supply node, VCC. A second terminal of the switch S1 and a second terminal of the capacitor C17 arc coupled to the second ground node. The switch S1 initiates a soft system reset which activates an appropriate one of the three "learning sequences" so that the interface device 100 "learns" the signaling characteristics of the telephone set 102.

A MUTE-SW terminal of the controller 302 is coupled to a first terminal of a resistor R20. A second terminal of the resistor R20 is coupled to the supply node VCC. The MUTE-SW terminal can be enabled to mute signals generated by the telephone instrument 104, but, as shown in FIG. 9, this mute function is configured to be disabled.

A system block diagram of the preferred embodiment of the adaptive circuit 200 is illustrated in FIG. 10. The adaptive circuit 200 is preferably a full custom mixed (analog and digital) signal integrated circuit that is designed to interface directly to the telephone base 108 and is controlled by the controller 302, as illustrated in FIG. 9.

Within the adaptive circuit 200, the 32 bit addressable latch 1 includes inputs A0–BA4 which are coupled to the pins LA0–LA4 of the adaptive circuit 200. An input DATA IN and output DATA OUT of the 32 bit addressable latch 1 are coupled to the pins DATA IN and DATA OUT, respectively, of the adaptive circuit 200. An enable input ENABLE of the latch 1 is coupled to a mode latch 4 and to the pin MODE/ENABLE of the adaptive circuit 200. A reset input RESET of the latch 1 is coupled to the mode latch 4 and to the pin RESET of the adaptive circuit 200. The mode latch 4 is controlled by the signals from the pins ENABLE and RESET and saves a current mode which the adaptive circuit 200 is operating in. Outputs b0–b15 of the latch 1 are coupled to control a 4×4 cross-point switch array 2. Outputs b16–b18 of the latch 1 are coupled to control a receive input multiplexer 5. Outputs b19–b21 of the latch 1 are coupled to control a transmit output multiplexer 6. Output b22 of the latch 1 provides a receive/transmit disable/enable control signal. Output b23 of the latch 1 is coupled to an input ON of a switchable dial tone filter RX-6. Output b24 of the latch 1 is coupled to an input PR of a flip-flop 7, to an input A of a multiplexer 9 and to a clock input CLK of the switchable dial tone filter RX-6. Output b25 of the latch 1 provides a signal S/H SPEED which is coupled to an input C of the flip-flop 7 and to a select input of the multiplexer 9. Outputs b26–b31 of the latch 1 are coupled to control a 150 ohm shunt select array 3.

The Lines 1–4 are coupled as inputs to the shunt array 3. The shunt array 3 is 4also coupled to the switch array 2. Outputs of the switch array 2 are coupled to the pins RX1 OUT and RX2 OUT of the adaptive circuit 200 to provide an output received signal. Inputs of the switch array 2 are coupled to the pins TX1 IN and TX2 RET of the adaptive circuit 200, to receive a transmit signal. Outputs of the multiplexer 5 are coupled as inputs D0, D1 and D2 of a receive input step attenuator RX-2. Two sets of control inputs MRX-1, 2, 3, (LA0, LA1 and LA2) and BITS b16, b17, b18 are coupled to multiplexer 5. Outputs of multiplexer 6 are coupled as inputs D0, D1 and D2 of a transmit output step attenuator TX-5. Two sets of control inputs MTX-1, 2, 3 (LA0, LA1 and LA2) and BITS b19, b20, b21 are coupled to multiplexer 6. An output MODE of the mode latch 4 is coupled to the selection control inputs of multiplexers 5 and 6.

The receive input pins RX1 IN and RX2 IN of the adaptive circuit 200 are coupled as inputs to a receive input differential amplifier RX-1. An output of the amplifier RX-1 is coupled as an input to the receive input step attenuator RX-2. An output of the attenuator RX-2 is coupled as an input to a receive voltage controlled amplifier (VCA) RX-3, as an input to a switchable dial tone filter RX-6.

A receive voltage control pin RX VC IN of the adaptive circuit 200 is coupled as a control input to the receive VCA RX-3. Automatic level control (ALC) pins ALC TC1, ALC TC2 and ALC IN of the adaptive circuit 200 are coupled as inputs to an ALC circuit RX-5. An output of the ALC circuit RX-5 is coupled as an ALC input to the receive VCA RX-3. An output of the receive VCA RX-3 is coupled to a receive filter pin RX FILT1 of the adaptive circuit 200 and as an input to a receive output amplifier RX-4. An output b22 of the latch 1 is coupled as a receive disable input to the amplifier RX-4. A receive output signal is provided as an output from the amplifier RX-4 and coupled to a receive output pin RX OUT of the adaptive circuit 200.

A transmit reference input pin TX REF INPUT of the adaptive circuit 200 is coupled as an input to a transmit reference filter TX-1. An output b24 of the latch 1 is coupled as a clock input to the filter TX-1. A transmit input pin TX INPUT of the adaptive circuit 200 is coupled as an input to a transmit pre-amplifier circuit TX-2. A mute pin MUTE CAP of the adaptive circuit 200 is coupled as an input to the pre-amplifier circuit TX-2. The output b22 of the latch 1 is coupled as transmit enable input to the pre-amplifier circuit TX-2. An output of the pre-amplifier circuit TX-2 is coupled to an output of the filter TX-1 and as an input to a transmit VCA TX-3 and an expander circuit TX-4.

Pins XPND1 CAP and XPND2 CAP of the adaptive circuit 200 are coupled as inputs to the expander circuit TX-4. An output of the expander circuit TX-4 is coupled as an input to the transmit VCA TX-3. A transmit pin TX VCIN of the adaptive circuit 200 is coupled to an input of the transmit VCA TX-3. An output of the transmit VCA TX-3 is coupled as an input to the transmit output step attenuator TX-5. An output of the attenuator TX-5 is coupled as an input to a transmit output amplifier TX-6. Transmit filter pins TX FILT1 and TX FILT2 of the adaptive circuit 200 are coupled to inputs of the amplifier TX-6. A transmit output signal is output from the amplifier TX-6 and coupled to the transmit output pin TX OUT of the adaptive circuit 200.

An input D of the flip-flop 7 is coupled to ground. An output Q of the flip-flop 7 is coupled as a reset input to a ½ dividing circuit 8 and a 1/16 dividing circuit 10. An output of the ½ dividing circuit 8 is coupled as an input B to the multiplexer 9. An output 0 of the multiplexer 9 is coupled as an input to the 1/16 dividing circuit 10 and to an anti-alias filter circuit RX-7. An output of the switchable dial tone filter circuit RX-6 is coupled as an input to the filter RX-7. An output of the filter RX-7 is coupled as an input to a sample and hold circuit RX-8. An output of the 1/16 dividing circuit 10 is coupled as an input to the sample and hold circuit RX-8. An output of the sample and hold circuit RX-8 is coupled to a receive level reference pin RX REF OUT of the adaptive circuit 200.

A timing capacitor pin SLEEP of the adaptive circuit 200 is coupled as an input to a sleep circuit and system power supply 11. Power supply pins VCC, VREFGND and GND of the adaptive circuit 200 are coupled as inputs to the sleep circuit and system power supply 11. The inputs RX1 and RX2 to the amplifier RX-1 are coupled as inputs to the sleep circuit and system power supply 11. An output of the sleep circuit and system power supply 11 is coupled to a bandgap reference circuit 12. An output of the bandgap reference circuit 12 is coupled to a voltage reference pin VREF of the adaptive circuit 200.

The controller 302 is able to address and manipulate the 32 bit addressable latch 1, thereby controlling the 4×4 cross-point switch array 2 and 150 ohm resistor shunt array 3, within the adaptive circuit 200. The cross-point switch array 2 has four input ports which are coupled to a four-line telephone base port 112 through the array 3, as illustrated by the lines 1–4, and through the relay 166 (FIG. 9). The 150 ohm resistor shunt array 3 contains six switchable shunt resistors, is configured in parallel with the cross-point switch array 2 input ports, and is capable of providing a 150 ohm shunt resistance between any of the 4 line inputs.

When a telephone accessory 104 (FIG. 1) and the interface device 100 of the present invention are first plugged into a telephone base 108 (FIG. 1), the accessory may not operate appropriately because it has not yet been optimally configured to electronically communicate with the telephone base 108 (FIG. 1). A Central Office dial tone is applied by the telephone base unit 108 to two of the lines of the port 116 (FIGS. 1 and 2). Under control of the controller 302, the addressable latch 1 manipulates the cross-point array 2 and the shunt select array 3 by sequentially coupling pairs of line input ports (Lines 1–4) until a CO dialtone is sensed by the controller 302 in the receive channel. This information is then latched for further analysis by the controller 302.

The two receive lines through which a CO dialtone is detected, are coupled to the receive input differential amplifier RX-1 which is terminated with a known resistive impedance. In the preferred embodiment, the resistive impedance is 1 K ohm.

A 28 dB energy variance typically exists between telephones that are commercially available. Accordingly, in a voice application, a telephone headset or other accessory that is configured to work with one telephone base unit could provide an uncomfortably loud signal when used with a second base unit or be significantly quiet when used with a third telephone base unit. To solve this problem, the output of the differential amplifier RX-1 is coupled to the input of the receive step attenuator RX-2. The receive step attenuator RX-2 is initially configured to provide maximum attenuation and then increases the receive signal in 4 dB increments until a predetermined target reference level is sensed by the controller 302, thereby equalizing the receive channel sensitivity. The receive step attenuator RX-2 is coupled to the receive input multiplexer 5 which is controlled by the 32 bit addressable latch 1. The controller 302 controls both the bit addressable latch 1 and the receive input multiplexer 5 thereby setting the attenuation by the step attenuator RX-2.

The equalized receive signal is then coupled to the voltage controlled amplifier RX-3 which can have fixed gain or allow the user or the controller 302 to control the volume level of the receive signal through a port RX VC IN which is coupled to the voltage controlled amplifier RX-3. An output of the automatic level control circuit RX-5 is also coupled to an ALC control input on the voltage controlled amplifier RX-3 and is capable of controlling the amplifier gain.

The automatic level control circuit RX-5 acts as a dynamic output limiting system with an overall dynamic range of 40 dB. The automatic level control circuit RX-5 input samples the output level of the receive channel and has a selectable limiting threshold as shown in FIG. 9 which is adjusted using the ALC level adjust circuit 260. The automatic level control circuit RX-5 is capable of limiting the output level of the receive signal to a predetermined level to prevent large, potentially harmful, signals from reaching a user. In voice applications, the user's ears will be protected from prolonged high decibel sounds by the automatic level control circuit RX-5, thereby preventing potential damage to the user's hearing. The ALC timing capacitors 214 and 216, illustrated in FIG. 7, are coupled to the pins ALC TC1 and ALC TC2 and are used to set the attack and release timing characteristics of the ALC circuit RX-5.

The equalized receive signal is output from the receive VCA RX-3 and coupled as an input to the receive output amplifier RX-4 which is capable of driving resistive, capacitive and inductive loads via the receive output port RX OUT for compatibility with voice or data interfaces. The filtering capacitor C14 illustrated in FIG. 9 which is coupled to the pin RX FILT1 of the adaptive circuit 200 determine the receive channel frequency response.

The controller 302 monitors the receive signal by sampling the signal through the receive level reference port RX REF OUT. The receive signal sample for the controller 302 is taken at the output of the receive step attenuator RX-2 and is filtered by the dialtone filter RX-6, then the anti-alias filter RX-7. The receive signal sample is finally coupled into the sample and hold circuit RX-8 prior to being passed on to the receive level reference port RX REF OUT. The receive level reference port RX REF OUT is coupled directly to the A/D input of the controller 302. The controller 302 controls the dialtone filter RX-6, anti-alias filter RX-7 and sample and hold circuit RX-8 via the 32 bit addressable latch 1 and synchronizes these switched capacitor filters with the use of the clock circuitry shown in the blocks 7, 8, 9 and 10.

Once the receive lines are determined and the channel sensitivity is adjusted for optimal performance, the transmit lines and sensitivity are then determined. Based on the selected receive lines, certain transmit line configurations are highly probable and are prioritized in the system algorithms.

Utilizing the side tone characteristics of telephone base units, the controller 302 will continue to monitor the receive signal path via the receive level reference output port RX REF OUT for calibration of the transmit channel.

A transmit preamplifier TX-2 is used as the interface for the user voice or data input signal and provides some pre-amplification of the input signal in addition to a channel mute user portion. It should be noted that this mute stage is enabled during the "learning" process to prevent the user from inserting a variant signal into the transmit path. The output of the transmit preamplifier TX-2 is coupled to the transmit VCA TX-3 and the transmit expander circuit TX-4.

During a "learning" procedure, the controller 302 generates a 1 KHz transmit calibration signal into the transmit reference input port TX REF INPUT. The 1 KHz calibration signal is then coupled into the transmit reference low pass filter TX-1 which is controlled by the 32 bit addressable latch 1 and, hence, the controller 302. The transmit reference low pass filter TX-1 filters out the odd harmonics of the calibration signal and outputs the result to the transmit VCA TX-3 and the expander circuit TX-4.

The input of the expander circuit TX-4 is coupled to the output of the transmit preamplifier TX-2 and the transmit reference low pass filter TX-1. The expander circuit TX-4 differentiates input noise from the desired signal. The expander circuit TX-4 output is coupled to a control input of the transmit VCA TX-3 and provides electronic noise reduction by attenuating the transmit VCA gain as it relates to unwanted background noise. The timing capacitors C19, C20 illustrated in FIG. 9 which are coupled to the pins XPND1 and XPND2 are used to determine the expander attack and release characteristics.

The transmit VCA TX-3 receives its inputs from the transmit preamplifier TX-2 and transmit reference low pass filter TX-1 and serves two primary purposes. The transmit VCA TX-3 works in conjunction with the transmit expander circuit TX-4 to provide electronic noise reduction and provides an overall transmit channel output level adjustment to allow precise interface matching via an optional transmit volume control function. The transmit volume control switch 126 is illustrated in FIG. 9. The output of the transmit VCA TX-3 is coupled to the transmit output step attenuator TX-5.

The controller 302 will begin manipulating the cross-point switch array 2 by sequentially coupling pairs of the transmit output ports starting with the most probable pairs defined in the system algorithms. A description, which illustrates the system's switching algorithms, is shown in detail in FIGS. 4 and 5. The 1 KHz transmit calibration signal is therefore applied to the telephone base unit 108 (FIG. 1) via the port 116 until the 1 KHz signal is sensed by the controller 302 at the receive level reference output RX REF OUT. When the controller 302 senses the 1 KHz signal, it will have successfully located the appropriate transmit lines and will latch the information and begin the transmit output step attenuator TX-5 adjustment.

A 49 dB variance in transmit line sensitivity typically exists between telephone base units that are commercially available. A precise sensitivity interface match is critical for optimal performance of the transmitted signal with the various telephone base units. To solve this problem, the signal output of the transmit VCA TX-3 is coupled into the transmit output step attenuator TX-5 which effects the transmit output level. The transmit output step attenuator TX-5 is coupled to the transmit output multiplexer 6 which is controlled by the 32 bit addressable latch 1 and, therefore, by the controller 302. The controller 302 will adjust the transmit step attenuator TX-5 in 7 dB increments until a predetermined 1 KHz target reference level is sensed by the controller 302, thereby equalizing the transmit channel sensitivity to the appropriate level. The signal output of the transmit output step attenuator TX-5 is coupled to the transmit output amplifier TX-6.

The transmit output amplifier TX-6 is capable of providing a voltage or current drive output and driving resistive, capacitive or inductive loads. A coupling capacitors C24A1 and C24B1 couple the transmit output signal from the pin TX OUT into the cross-point switch array 2 through the transmit input pin TX1 IN. The filtering capacitors C15, C23 illustrated in FIG. 9 which are coupled to the pins TX FILT1 and TX FILT2 are used to determine the transmit channel frequency response.

To conserve on battery life of the power supply 11, the adaptive circuit 200 includes the sleep circuit within the power supply 11. The sleep circuit 11 is coupled between the VCC port and the main IC block power supplies. The sleep circuit control input is coupled to the inputs RX1 and RX2 of the receive differential amplifier RX-1. If the incoming broadband noise on the receive lines drops below a certain level, preferably −77 dBV, the sleep circuit begins a timing sequence as determined by the value of the sleep timing capacitor C27 illustrated in FIG. 9. If the broadband receive signal does not exceed the −77 dBV threshold within the programmed time-frame, the adaptive circuit 200 enters into the sleep mode and shuts down. When the broadband receive signal exceeds the −77 dBV threshold, the sleep timing sequence resets and the analog integrated circuit "wakes up" within 5 milliseconds (ms).

As illustrated in FIG. 10, the SLP1 and SLP2 terminals are coupled to the sleep circuit and system power supply 11. The capacitor C25 illustrated in FIG. 9 removes internal DC offsets from the sleep circuit and system power supply 11.

The preferred embodiment for the adaptive circuit 200 is powered by any convenient power source which can be directly connected to the pin VCC to serve as the primary circuit power supply. The bandgap reference circuit 12 develops a stable reference voltage for use internally in the adaptive circuit 200 and externally for the controller 302 and VCA control voltages.

Figure 11:
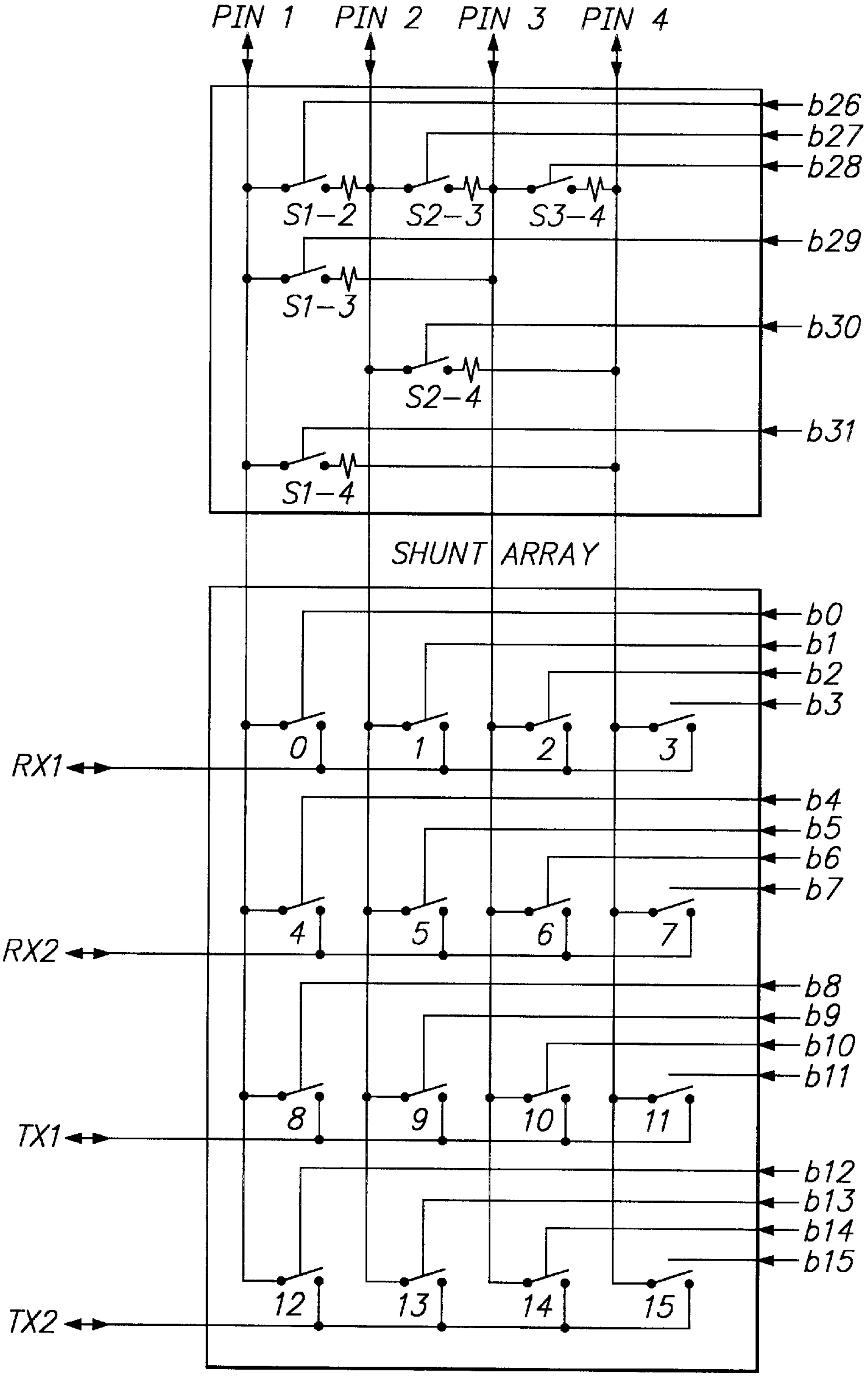
FIG. 11 illustrates a block diagram of 4×4 cross-point switch and shunt resistor arrays.

A block diagram of the 4×4 cross-point switch array 2 and the 150 ohm shunt resistor array 3 is illustrated in FIG. 11. The cross-point switch array consists of a 4×4 matrix of analog switches designed to connect the Lines 1–4 to the two transmit and two receive channels in any order and polarity. It is under the control of the controller 302, through the bit addressable latch 1, that the appropriate transmit and receive lines are determined, as described above.

Because the signalling characteristics of the telephone set are closely matched by the interface device 100, data rates can be high when a modem, fax modem or fax machine, is coupled to the port 128 (FIG. 1). For example, the data rates may be as high as 56 Kbps. In addition, the interface device 100 provides improved sound quality when an audio telephone instrument, such as a teleconferencing device, is coupled to the port 128. Further, these advantages are achieved by a single interface device 100 which is adaptive for interfacing telephone instruments which communicate data or audio signals to the handset port 112 (FIG. 1) and which is adaptive for interfacing telephone sets having various different signalling characteristics to such telephone instruments.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the method of the present invention could be implemented in several different ways and the apparatus disclosed above is only illustrative of the preferred embodiment of the present invention and is in no way a limitation.

What is claimed is:

1. An apparatus for interfacing a telephone instrument having a bi-directional signal port to a telephone set having a base and a handset, the base having a base signal port for providing a speaker signal and for receiving a microphone signal, and the handset having a speaker for receiving the speaker signal and a microphone for providing the microphone signal, the apparatus comprising:

a. a phone port having a predetermined number of contacts, the phone port for electrically coupling to the base signal port;

b. a handset port having the predetermined number of contacts, the handset port for electrically coupling to the microphone and speaker;

c. a telephone instrument port for electrically coupling to the bi-directional signal port of the telephone instrument;

d. a first signal path coupled between the phone port and the handset port;

e. a second signal path coupled between the phone port and the telephone instrument port wherein the second signal path includes an adaptive circuit having a receive signal path coupled to the phone port and a transmit signal path coupled to the phone port and the second signal path includes a converter coupled between the adaptive circuit and the telephone instrument port for converting the receive signal path and the transmit signal path into a bi-directional signal path, wherein the adaptive circuit adjusts a level of amplification in the receive signal path according to a level of a dial tone signal received from the phone port; and f. a relay for selectively electrically coupling the phone port to the handset port via the first signal path and for selectively electrically coupling the phone port to the telephone instrument port via the second signal path.

2. The apparatus according to claim 1 wherein the receive signal path includes appropriate ones of the contacts of the phone port wherein the appropriate ones are selected by selectively placing ones of the contacts of the phone port in the receive signal path until the dial tone signal is sensed.

3. The apparatus according to claim 2 wherein the adaptive circuit includes a cross-point switch matrix for selectively placing ones of the contacts of the phone port in the receive signal path.

4. The apparatus according to claim 3 wherein the adaptive circuit further comprises a differential amplifier in the receive signal path for amplifying a signal, regardless of its polarity.

5. The apparatus according to claim 4 wherein the adaptive circuit further comprises an output automatic gain adjusting circuit coupled to the differential amplifier for providing predetermined range of signal amplitudes.

6. The apparatus according to claim 1 wherein the adaptive circuit adjusts a level of amplification in the transmit signal path according to a level of a reference signal applied to the transmit signal path and sensed via the receive signal path.

7. The apparatus according to claim 6 wherein the transmit signal path includes appropriate ones of the contacts of the phone port wherein the appropriate ones are selected by selectively placing ones of the contacts of the phone port in the transmit signal path until the reference signal is sensed.

8. The apparatus according to claim 7 wherein the adaptive circuit includes a cross-point switch matrix for selectively placing ones of the contacts of the phone port in the transmit signal path.

9. The apparatus according to claim 8 wherein the adaptive circuit further comprises a low-pass filter for filtering the reference signal, the low-pass filter coupled to the transmit signal path.

10. The apparatus according to claim 8 wherein a level of amplification in the transmit signal path is user adjustable.

11. The apparatus according to claim 8 wherein the transmit signal path further comprises means for reducing the level of noise in the output signal.

12. The apparatus according to claim 1 wherein the adaptive circuit further comprises means for placing the interface system in a low power consumption state after a predetermined period of inactivity of a received signal, the means for placing coupled to the receive signal path.

13. The apparatus according to claim 1 wherein the relay is controlled according to a on-hook/off-hook condition of the telephone instrument.

14. An apparatus for interfacing a telephone instrument having a bi-directional signal port to a telephone set having a base and a handset, the base having a base signal port for providing a speaker signal and for receiving a microphone signal, and the handset having a speaker for receiving the speaker signal and a microphone for providing the microphone signal, the apparatus comprising:

a. a phone port having a predetermined number of contacts, the phone port for electrically coupling to the base signal port;

b. a handset port having the predetermined number of contacts, the handset port for electrically coupling to the microphone and speaker;

c. a telephone instrument port for electrically coupling to the bi-directional signal port of the telephone instrument;

d. a first signal path coupled between the phone port and the handset port;

e. a second signal path coupled between the phone port and the telephone instrument port wherein the second signal path includes an adaptive circuit having a receive signal path coupled to the phone port and a transmit signal path coupled to the phone port and the second signal path includes a converter coupled between the adaptive circuit and the telephone instrument port for converting the receive signal path and the transmit signal path into a bi-directional signal path, wherein the receive signal path includes appropriate ones of the contacts of the phone port wherein the appropriate ones are selected by selectively placing ones of the contacts of the phone port in the receive signal path until a dial tone signal is sensed; and f. a relay for selectively electrically coupling the phone port to the handset port via the first signal path and for selectively electrically coupling the phone port to the telephone instrument port via the second signal path.

15. The apparatus according to claim 14 wherein the adaptive circuit includes a cross-point switch matrix for selectively placing ones of the contacts of the phone port in the receive signal path.

16. The apparatus according to claim 15 wherein the adaptive circuit further comprises a differential amplifier in the receive signal path for amplifying a signal, regardless of its polarity.

17. The apparatus according to claim 16 wherein the adaptive circuit further comprises an output automatic gain adjusting circuit coupled to the differential amplifier for providing predetermined range of signal amplitudes.

18. The apparatus according to claim 14 wherein the transmit signal path includes appropriate ones of the contacts of the phone port wherein the appropriate ones are selected by selectively placing ones of the contacts of the phone port in the transmit signal path until a reference signal applied to the transmit path is sensed via the receive signal path.

19. The apparatus according to claim 18 wherein the adaptive circuit includes a cross-point switch matrix for selectively placing ones of the contacts of the phone port in the transmit signal path.

20. The apparatus according to claim 18 wherein the adaptive circuit adjusts a level of amplification in the transmit signal path according to a level of a reference signal applied to the transmit signal path and sensed via the receive signal path.

21. The apparatus according to claim 20 wherein a level of amplification in the transmit signal path is user adjustable.

22. The apparatus according to claim 21 wherein the adaptive circuit further comprises a low-pass filter for filtering the reference signal, the low-pass filter coupled to the transmit signal path.

23. The apparatus according to claim 21 wherein a level of amplification in the transmit signal path is user adjustable.

24. The apparatus according to claim 21 wherein the transmit signal path further comprises means for reducing the level of noise in the output signal.

25. The apparatus according to claim 14 wherein the adaptive circuit further comprises means for placing the interface system in a low power consumption state after a predetermined period of inactivity of a received signal, the means for placing coupled to the receive signal path.

26. The apparatus according to claim 14 wherein the relay is controlled according to a on-hook/off-hook condition of the telephone instrument.

* * * * *

UNITED STATES PATENT AND TRADEMARK OFFICE

CERTIFICATE OF CORRECTION

PATENT NO. : 5,912,964

DATED : June 15, 1999

INVENTOR(S) : Bruce W. Stelman

It is certified that error appears in the above-identified patent and that said Letters Patent is hereby corrected as shown below:

ON THE TITLE PAGE:

Item [56] References Cited - OTHER PUBLICATIONS

Regarding Publication IBM Technical Disclosure Bulletin, delete "vol." and insert --Vol.--.

Regarding Walker Equipment Corp. advertisement, delete "advetisement" and insert --advertisement--.

In column 13, line 17, delete "A. Rect" and insert --A Rect--.
In column 15, line 60, delete "of Which" and insert --of which--.
In column 18, line 16, delete "A0-BA4" and insert --BA0-BA4--.
In column 18, line 43, delete "4also" and insert --also--.
In column 19, line 41, delete "output 0" and insert --output O--.

Signed and Sealed this

Thirty-first Day of October, 2000

Attest:

Q. TODD DICKINSON

Attesting Officer

Director of Patents and Trademarks